(12) United States Patent
McCorkle

(10) Patent No.: US 8,606,204 B2
(45) Date of Patent: Dec. 10, 2013

(54) COHERENT TRANSCEIVER AND RELATED METHOD OF OPERATION

(76) Inventor: John W. McCorkle, Vienna, VA (US)

( * ) Notice: Subject to any disclaimer, the term of this patent is extended or adjusted under 35 U.S.C. 154(b) by 270 days.

(21) Appl. No.: 13/077,092

(22) Filed: Mar. 31, 2011

(65) Prior Publication Data

US 2011/0256837 A1    Oct. 20, 2011

Related U.S. Application Data

(60) Provisional application No. 61/323,875, filed on Apr. 14, 2010.

(51) Int. Cl.
*H04B 1/16* (2006.01)
*H04B 1/38* (2006.01)

(52) U.S. Cl.
USPC .............................................. 455/216; 455/73

(58) Field of Classification Search
USPC .............. 455/216, 267, 73–77, 84–87, 550.1, 455/552.1, 78
See application file for complete search history.

(56) References Cited

U.S. PATENT DOCUMENTS

| | | | | |
|---|---|---|---|---|
| 4,737,788 A | * | 4/1988 | Kennedy | 342/29 |
| 6,091,355 A | * | 7/2000 | Cadotte et al. | 342/104 |
| 2009/0323782 A1 | * | 12/2009 | Baker et al. | 375/219 |

* cited by examiner

*Primary Examiner* — Ping Hsieh
*Assistant Examiner* — Xin Jia
(74) *Attorney, Agent, or Firm* — Posz Law Group, PLC

(57) ABSTRACT

A transceiver is provided, comprising: a programmable waveform generator configured to generate a base signal, the programmable waveform generator including a controllable waveform generator configured to generate an initial bandwidth signal having an initial frequency bandwidth; a multiple tone generator configured to generate a plurality of tone signals, each tone signal having a different frequency; one or more bandwidth multiplying circuits; and a control circuit a controller configured to control the operation of the controllable waveform generator, the tone generator and the one or more bandwidth multiplying circuits; a transmit port configured to output the base signal; a receive port configured to accept a received signal; a 90-degree splitter configured to receive the base signal and to generate a first split signal at a 0-degree output and a second split signal at a 90-degree output, the first and second split signals being separated by 90 degrees in phase; a first-mixer configured to mix the received signal and the first split signal to generate a quadrature-phase signal; and a second-mixer configured to mix the received signal and the second split signal to generate an in-phase signal.

17 Claims, 21 Drawing Sheets

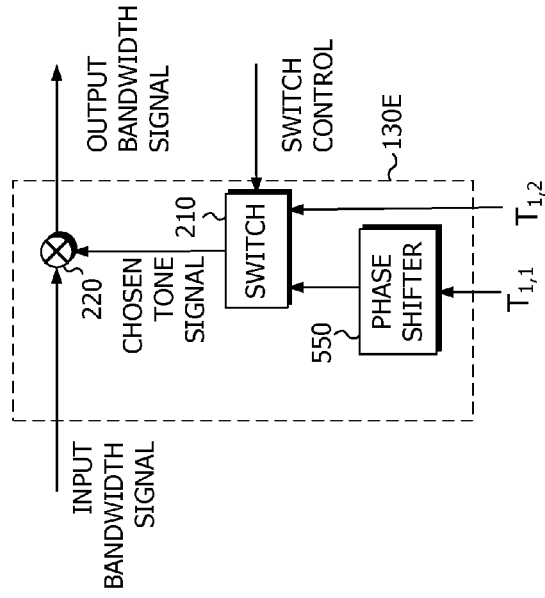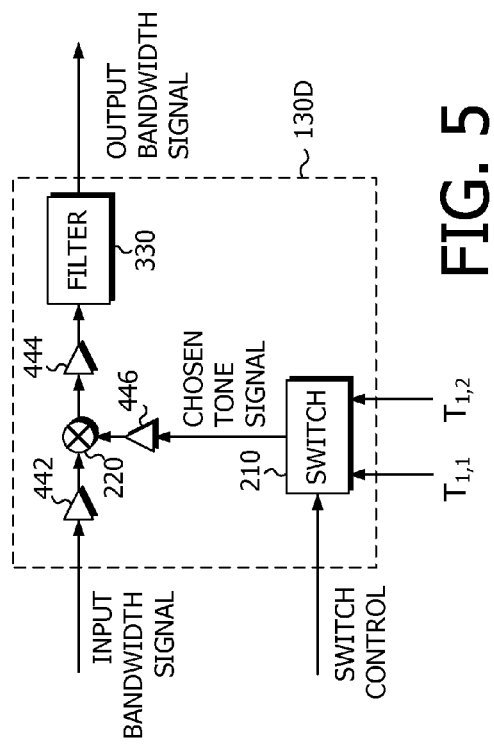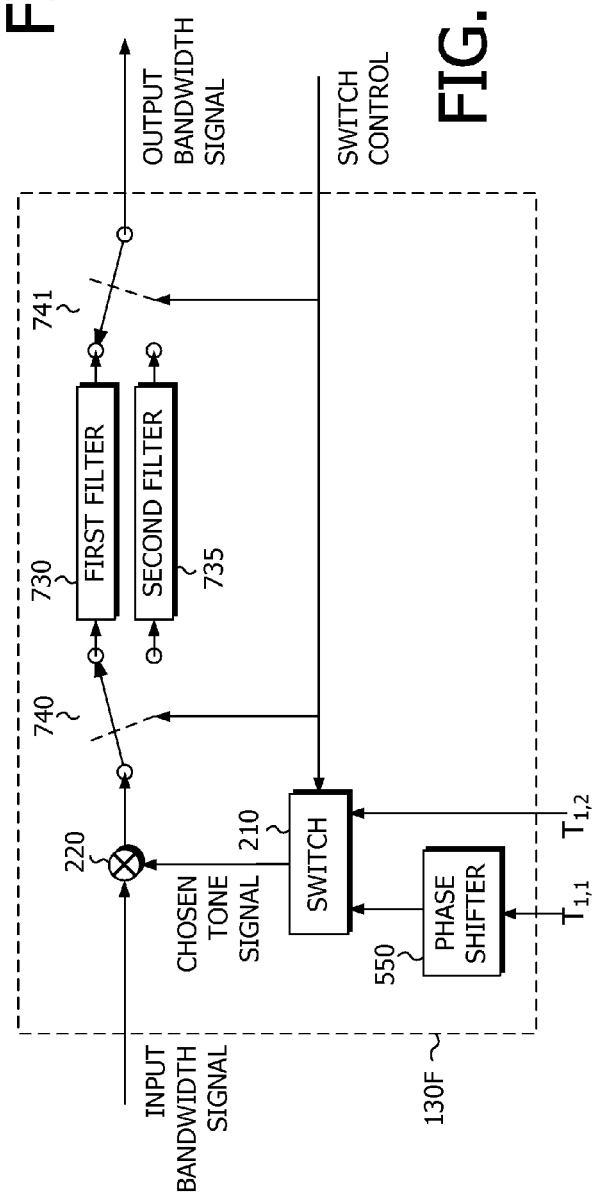

| State | Chosen Frequency on $I^{th}$ Multiplying Circuit | | |
|---|---|---|---|
| | 1st | 2nd | 3rd |
| A | $T_{1,1}$ | $T_{2,1}$ | $T_{3,1}$ |
| B | $T_{1,2}$ | $T_{2,1}$ | $T_{3,1}$ |
| C | $T_{1,1}$ | $T_{2,2}$ | $T_{3,1}$ |
| D | $T_{1,2}$ | $T_{2,2}$ | $T_{3,1}$ |
| E | $T_{1,1}$ | $T_{2,1}$ | $T_{3,2}$ |
| F | $T_{1,2}$ | $T_{2,1}$ | $T_{3,2}$ |
| G | $T_{1,1}$ | $T_{2,2}$ | $T_{3,2}$ |
| H | $T_{1,2}$ | $T_{2,2}$ | $T_{3,2}$ |
| ⋮ | ⋮ | ⋮ | ⋮ |

FIG. 12

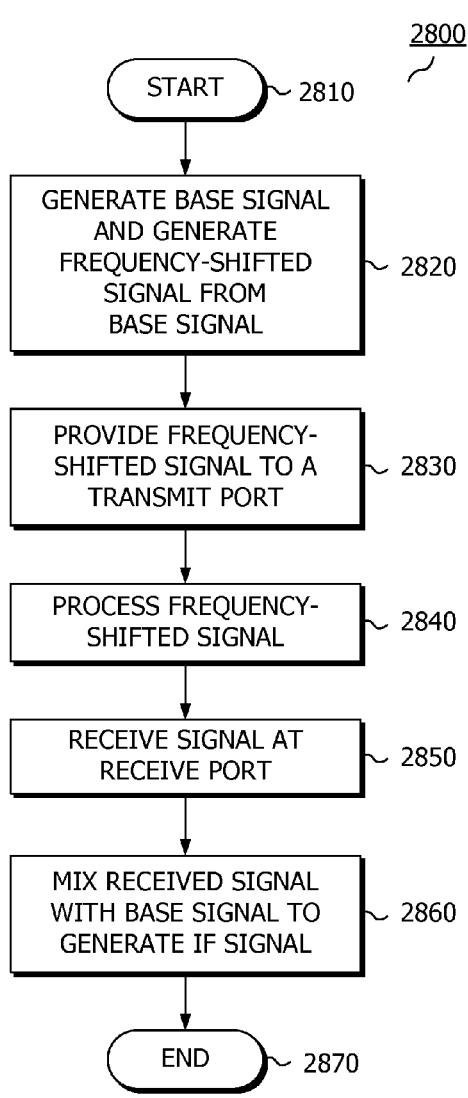
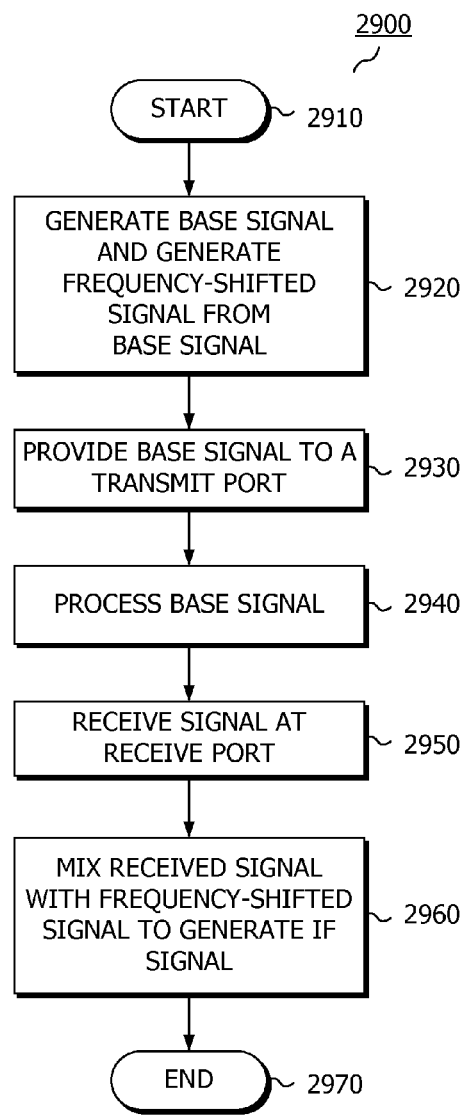
FIG. 28
FIG. 29

COHERENT TRANSCEIVER AND RELATED METHOD OF OPERATION

CROSS-REFERENCE TO RELATED PATENT DOCUMENTS

This application relies for priority on U.S. provisional application Ser. No. 61/323,875, by John W. McCorkle, filed 14 Apr. 2010, entitled "COHERENT TRANSCEIVER AND RELATED METHOD OF OPERATION," the contents of which is hereby incorporated by reference in its entirety.

FIELD OF THE INVENTION

This application relates to high accuracy, low noise, small footprint, wide bandwidth, radar (RAdio Detection And Ranging), communications, and test instrumentation such as spectrum analyzers and network analyzers. All of these applications benefit from the ability to sweep or switch, across wide bandwidths, to a new frequency. The performance of these systems is tied to the speed of settling to a new frequency in a state of low drift, and low phase-noise. These applications also benefit from the ability to sweep across a wide frequency range with extreme linearity. This application relates to extending the performance of these systems in a small footprint.

BACKGROUND OF THE INVENTION

Transmitters generate signals. The heart of a transmitter is a signal generator. In the early days of radio, a radio receiver was made with a tunable filter. The difficulty of making a filter both tunable and extremely sharp, and extremely stable, has caused nearly all radios to use a super-heterodyne process because the hard-to-implement tunable filter is replaced with a simple highly optimized fixed tuned filter. The tuneability is gained via the use of a variable frequency signal generator. In a super-heterodyne receiver, the incoming signal is mixed with a variable frequency tone from a signal generator so as to shift its frequency to the narrow passed of a very sharp, fixed tuned, filter. As a result, the burden of tuneability and stability fall on the variable frequency signal generator.

One common waveform used in radar, sonar, and test instrumentation is a linear ramp in frequency, which is referred to as a chirp. Radars and instrumentation use linear chirp waveforms to obtain a resolving power that is, theoretically, proportional to the bandwidth of the chirp. For example, a radar with a 50 MHz bandwidth linear chirp can resolve two objects that are about 10 feet apart. A 500 MHz bandwidth linear chirp radar can resolve to objects that are about 1 foot apart. Because of the increased resolving power, there is great benefit to wider bandwidth capability. As the time bandwidth product grows, however, achieving the theoretical resolving power in practice becomes difficult due to the extremely high linearity required on the frequency ramp. It is an objective of this disclosure to show a method of implementing high timebandwidth radar, sonar, and test instrumentation over extremely wide bandwidths, which are able to achieve near theoretically ideal performance, yet in a small footprint.

Another common waveform used in radar, sonar, and test instrumentation is stepped frequency waveforms. Generally, the system generates a tone at its transmit port for a short period of time which is long enough to excite some process being measured, like a device under test in the case of instrumentation, or in the case of radar or sonar, the various objects that reflect the energy during round trip time it takes the energy to travel from the radar or sonar to some distant point and back. Similar to the chirp, the resolving power is proportional, theoretically, to the bandwidth between the lowest frequency step and the highest frequency step.

Systems that use stepped frequency waveforms are hindered by the settling time that must occur at each frequency step. Until the new frequency has settled to a very high stability state, the system cannot transmit or receive a proper signal and therefore must cease functioning while a step is occurring. The net result is that there is a duty cycle reduction caused by the required settling time, and typically some performance degradation because in order to increase the duty cycle and save time, the system is allowed to run before a step is fully settled. For example, suppose that a system is stepping in frequency in 1 MHz steps, and is collecting data for 1 us at each frequency step. If one assumes a typical PLL oscillator takes 100 us to switch and settle to a new frequency, then the system spends about 99% of its time settling, and about 1% actually working. In other words, it has only a 1% duty cycle. In this example, the radar or sonar or instrumentation system could be made to operate nearly 100 times faster, or generate an SNR 100 times higher, if the settling time could be reduced to a small fraction of the 1 us duration needed at each frequency step. It is an objective of this disclosure to show a method of implementing radar, sonar, and test instrumentation capable of operating over extremely wide bandwidths with high duty cycle and achieving near ideal performance, yet in a small footprint.

Spread spectrum systems like secure communications and anti jam radars use frequency hopping as a means to spread their signal. While classical radar and test instrumentation typically make small incremental frequency steps that progressively go between the lowest and highest frequencies, the hopping used in spread spectrum systems requires the frequency steps to be taken randomly, including hopping quickly between the minimum and maximum frequency. Typically, the wider spans and random nature of the hopping causes the settling times to be worse than sequentially stepped systems, ultimately causing an even worse duty cycle. It is an objective of this disclosure to show a method of implementing frequency hopped spread-spectrum, radar, sonar, and test instrumentation capable of operating over extremely wide bandwidths with high duty cycle and achieving near ideal performance, yet in a small footprint.

Radar, sonar, communications, and test instrumentation sometimes use phase coding as a means of spectrum spreading and/or modulation and demodulation. It is an objective of this disclosure to show a method of implementing radar, sonar, communications and test instrumentation capable of using combinations of phase and frequency coding over extremely wide bandwidths, with high duty cycle and achieving near ideal performance, yet in a small footprint.

Signal generators take many forms, from (a) a basic analog oscillator circuit that oscillates at a frequency governed by an RC (resistor capacitor) network, or the resonance of an LC (inductor—capacitor) circuit or the resonance or delay of devices such as a SAW (surface acoustic wave) device, or a crystal, or a dielectric resonator, or BAW (bulk acoustic wave) device, etc., to (b) an analog oscillator followed by a nonlinear stage that generates a harmonic term that is isolated by a filter to serve as the output tone, to (c) a combination of analog and digital circuits that may lock a higher frequency oscillator with poor long term stability but good short term stability, to a low frequency oscillator with good long term stability, but poor short term stability, such as phase-lockedloop (PLL), to (d) an NCO (numerically controlled oscillator) that is formed by driving a DAC (digital to analog converter) with data that causes the DAC to produce the desired output signal. Each method results in different sets of advantages and disadvantages in terms of metrics such as size, cost, weight, power consumption, settling time after a frequency change, modulation bandwidth, modulation linearity, long and short term stability, harmonic levels, spurious levels, and flexibility or ease of control.

Numerically controlled oscillators are well known to achieve optimally fast (short) settling times. At the same time, due to a combination of their discrete-time digitally-sampled stair-step output waveform, and the fact that the stair-step output levels must settle in each time-step period, an NCO cannot be clocked fast enough to produce the bandwidth required by many applications. It is an objective of this disclosure to show a method of obtaining arbitrarily large bandwidths.

Many applications are extremely sensitive to spurious signals. Applications such as radar, ladar (LAser Detection And Ranging), sonar, and numerous instrumentation applications, are fundamentally limited by the SFDR of the signals they generate and use to perform their function. The limit follows from the fact that they rely on correlations on these signals. Harmonic and spurious signals correlate along with the desired signal, causing an error in the measured correlation, which is supposed to only come from the desired signal.

One method of extending the bandwidth of an NCO is to use a frequency multiplier. This can be done using common mixer circuits or by using a circuit that generates harmonics and then filtering out all the harmonics that are undesired. This method results in a high noise floor and is unsuitable for many applications. Additionally, if the initial waveform was a complex waveform with, for example, a desired spectral notch, the multiplication process would destroy the notch. Another objective of this disclosure is to extend the bandwidth yet maintain a low noise floor, and preserve characteristics like spectral notches in the initial waveform.

Another method of extending the bandwidth of an NCO is to use a mixer together with a large N-way switch network and family of N tones spaced in frequency by the bandwidth (B) of the NCO. The switch network selects the desired tone and the NCO output signal is shifted in frequency by the frequency of the selected tone. In this way, the bandwidth covered by the output signal is N times the bandwidth of the NCO. This method results in a high power and a physically large and costly system that is incompatible with many applications. Another objective of this disclosure is to extend the bandwidth, yet at low power, a small footprint, and at relatively low cost.

Another method of extending the bandwidth of an NCO is a variant of the above paragraph, where the set of N oscillators is replaced by one or a smaller number of PLL synthesizers which are capable of being commanded to generate the N needed frequencies. The relatively slow switching speed of the PLL's in this solution, however, makes it unsuitable for many applications. It also prevents the system from continuously sweeping across the extended bandwidth since the PLL settling time is so long. Another objective of this disclosure is to extend the bandwidth at low power and small footprint, and with the capability to sweep the entire extended bandwidth continuously, and with optimally fast hopping or switching speed.

SUMMARY OF THE INVENTION

The disclosed apparatus uses small, inexpensive, low-power hardware to generate an initial signal spanning a narrow frequency range, with high controllability and extremely fast settling time to a an extremely stable state with low-phase noise and drift. One way to accomplish this is employing a direct digital synthesizer (DDS); another way is storing a complex pre-computed waveform in random access memory (RAM) and using a digital to analog converter (DAC) to generate the initial signal. The disclosed circuit then uses a relatively small number of additional parts to make a relatively small number of tones and relatively simple switch and mixer network to operate on the initial signal so as to produce an extended bandwidth output signal covering a much wider frequency range with nearly equally fast settling time, high controllability, and low phase noise, as the initial source signal.

These additional parts extend the frequency range through a binary tree arrangement in order to minimize parts count. The binary tree is arranged, using high-side and low-side mixer injection to allow transitions between the tones to result in a output without transients. The combination of the binary tree and the specific frequencies chosen for the tones, and the arrangement of high and low side injection allows the entire output frequency range to be swept continuously without requiring any abrupt frequency changes from the initial signal generator. Since transients that cause filters to ring and not settle quickly are avoided, it also allows the hopping speed of the initial signal generator to be maintained across the entire extended output frequency range. By not requiring the initial signal to be multiplied, the controllability and low phase noise of the initial signal generator is maintained across the entire extended output frequency range.

Normally, an oscillator must be added every time the one extends the bandwidth by the bandwidth of the initial signal. For example, if the bandwidth of the initial signal was 100 MHz and the desired output bandwidth was 6.4 GHz, it would take 64 oscillators. Using the disclosed binary tree arrangement, every time a pair of oscillators is added, the output bandwidth is doubled. Using the disclosed method, the same 100 MHz initial bandwidth can be expanded to cover 6.4 GHz of bandwidth with only 12 oscillators. In general, if the ratio of output bandwidth to input bandwidth is $2^N$, then there is a factor of $2^N/(2 \log_2(N))$ reduction in the number of tones that must be generated and managed in a switching network. This reduction can significantly reduce the footprint and power required.

The extended bandwidth output signal is used to create the signal going to the transmit port. It is also used to create the local oscillator (LO) signals that are mixed with received signal coming from the receive port. In the creation of the signal going to the transmit port or the creation of the LO signal, the extended bandwidth output signal may, or may not, be frequency shifted and or phase shifted. Typically a 0-degree and 90-degree version of the LO signal are created, one driving an in-phase mixer, and one driving a quadrature mixer, to generate in-phase and quadrature phase system output signals.

A transceiver is provided, comprising: a programmable waveform generator configured to generate a base signal, the programmable waveform generator including a controllable waveform generator configured to generate an initial bandwidth signal having an initial frequency bandwidth; a multiple tone generator configured to generate a plurality of tone signals, each tone signal having a different frequency; one or more bandwidth multiplying circuits; and a control circuit a controller configured to control the operation of the controllable waveform generator, the tone generator and the one or more bandwidth multiplying circuits; a transmit port configured to output the base signal; a receive port configured to accept a received signal; a 90-degree splitter configured to receive the base signal and to generate a first split signal at a 0-degree output and a second split signal at a 90-degree output, the first and second split signals being separated by 90 degrees in phase; a first-mixer configured to mix the received signal and the first split signal to generate a quadrature-phase signal; and a second-mixer configured to mix the received signal and the second split signal to generate an in-phase signal.

The transceiver may further comprise: a transmit antenna connected to the transmit port; and a receive antenna connected to the receive port. The transceiver may be a radar transceiver.

The transceiver may further comprise: a first splitter connected between the programmable waveform generator and the transmit port and between programmable waveform generator and the 90-degree splitter, the first splitter configured to provide the base signal to both the transmit port and the 90-degree splitter. The transceiver may further comprise: a transmit filter connected between the first splitter and the transmit port.

The transceiver may further comprise: a transmit filter connected between the programmable waveform generator and the transmit port.

A radar transceiver is provided, comprising: a programmable waveform generator configured to generate a base waveform, the programmable waveform generator including a controllable waveform generator configured to generate an initial bandwidth signal having an initial frequency bandwidth; a multiple tone generator configured to generate a plurality of tone signals, each tone signal having a different frequency; one or more bandwidth multiplying circuits; and a control circuit a controller configured to control the operation of the controllable waveform generator, the tone generator and the one or more bandwidth multiplying circuits; a transmit antenna configured to transmit the base waveform as an outgoing waveform; a 90° power splitter configured to split the base waveform to a first split waveform and a second split waveform, the first and second split waveforms being separated by 90° in phase; a receive antenna configured to receive an incoming waveform; a first mixer configured to mix the incoming waveform with the first split waveform to generate an in-phase waveform; and a second mixer configured to mix the incoming waveform with the second split waveform to generate a quadrature-phase waveform.

The radar transceiver may further comprise: a first splitter connected between the programmable waveform generator and the transmit antenna and between programmable waveform generator and the 90° power splitter, the first splitter configured to provide the base waveform to both the transmit antenna and the 90° power splitter. The radar transceiver may further comprise: a transmit filter connected between the first splitter and the transmit antenna.

The radar transceiver may further comprise: a transmit filter connected between the programmable waveform generator and the transmit antenna.

The radar transceiver may further comprise: a second splitter connected between the receive antenna and the first and second mixers, the first splitter configured to provide the incoming waveform to both the first and second mixers. The radar transceiver may further comprise: a receive filter connected between the receive antenna and the second splitter.

The radar transceiver may further comprise: a receive filter connected between the transmit antenna and the first and second mixers.

A method of operating a transceiver system is provided, comprising: generating a base signal and a 90-degree shifted signal, the 90-degree shifted signal being a copy of the base signal that is shifted 90 degrees in phase from the base signal; providing the base signal to a transmit port; processing the base signal at the transmit port; receiving a received signal at a receive port; mixing the received signal with the base signal to generate an in-phase signal; and mixing the received signal with the 90-degree shifted signal to generate a quadrature-phase signal, wherein the operation of generating the base signal further comprises: setting an index value I equal to 0; generating an initial bandwidth signal $G_0$; performing an $(I+1)^{th}$ multiplier operation, including receiving an input bandwidth signal $G_I$, the input bandwidth signal $G_I$ having a bandwidth $B_I$, a low frequency $L_I$, and a high frequency $(L_I+B_I)$; receiving first and second tone signals $T_{I,1}$ and $T_{I,2}$; determining whether a current control state is a first control state or a second control state; selecting the first tone signal $T_{I,1}$ as a chosen signal if the current control state is determined to be the first control state; generating an output bandwidth signal $G_{I+1}$ such that an output frequency of the output bandwidth signal $G_{I+1}$ is equal to a sum of an input frequency of the input bandwidth signal $G_I$ and a first tone frequency of the first tone signal $T_{I,1}$, if the current control state is determined to be the first control state; selecting the second tone signal $T_{I,2}$ as the chosen signal if the current control state is determined to be the second control state; and generating the output bandwidth signal $G_{I+1}$ such that the output frequency of the output bandwidth signal $G_{I+1}$ is equal to a difference between a second tone frequency of the second tone signal $T_{I,2}$ and the input frequency of the input bandwidth signal $G_I$, if the current control state is determined to be the first control state; determining if additional multiplier operations are required; incrementing I by 1 and repeating the performing of the $(I+1)^{th}$ multiplier operation and the determining if additional multiplier operations are required if additional multiplier operations are required; and setting the output bandwidth signal $G_{I+1}$ as an operational output if no additional multiplier operations are required.

A method of operating a transceiver system is provided, comprising: generating a base signal and a frequency-shifted signal, the frequency-shifted signal being a copy of the base signal that is shifted in phase from the base signal; providing the frequency-shifted signal to a transmit port; processing the frequency-shifted signal at the transmit port; receiving a received signal at a receive port; and mixing the received signal with the base signal to generate an intermediate frequency signal, wherein the operation of generating the base signal further comprises: setting an index value I equal to 0; generating an initial bandwidth signal $G_0$; performing an $(I+1)^{th}$ multiplier operation, including receiving an input bandwidth signal $G_I$, the input bandwidth signal $G_I$ having a bandwidth $B_I$, a low frequency $L_I$, and a high frequency $(L_I+B_I)$; receiving first and second tone signals $T_{I,1}$ and $T_{I,2}$; determining whether a current control state is a first control state or a second control state; selecting the first tone signal $T_{I,1}$ as a chosen signal if the current control state is determined to be the first control state; generating an output bandwidth signal $G_{I+1}$ such that an output frequency of the output bandwidth signal $G_{I+1}$ is equal to a sum of an input frequency of the input bandwidth signal $G_I$ and a first tone frequency of the first tone signal $T_{I,1}$, if the current control state is determined to be the first control state; selecting the second tone signal $T_{I,2}$ as the chosen signal if the current control state is determined to be the second control state; and generating the output bandwidth signal $G_{I+1}$ such that the output frequency of the output bandwidth signal $G_{I+1}$ is equal to a difference between a second tone frequency of the second tone signal $T_{I,2}$ and the input frequency of the input bandwidth signal $G_I$, if the current control state is determined to be the first control state; determining if additional multiplier operations are required; incrementing I by 1 and repeating the performing of the (I+1)$^{th}$ multiplier operation and the determining if additional multiplier operations are required if additional multiplier operations are required; and setting the output bandwidth signal $G_{I+1}$ as an operational output if no additional multiplier operations are required.

The frequency-shifted signal may be shifted by 90 degrees in phase from the base signal.

A method of operating a transceiver system is provided, comprising: generating a base signal and a frequency-shifted signal, the frequency-shifted signal being a copy of the base signal that is shifted in phase from the base signal; providing the base signal to a transmit port; processing the base signal at the transmit port; receiving a received signal at a receive port; and mixing the received signal with the frequency-shifted signal to generate an intermediate frequency signal, wherein the operation of generating the base signal further comprises: setting an index value I equal to 0; generating an initial bandwidth signal $G_0$; performing an (I+1)$^{th}$ multiplier operation, including receiving an input bandwidth signal $G_I$, the input bandwidth signal $G_I$ having a bandwidth $B_I$, a low frequency $L_I$, and a high frequency ($L_I$+$B_I$); receiving first and second tone signals $T_{I,1}$ and $T_{I,2}$; determining whether a current control state is a first control state or a second control state; selecting the first tone signal $T_{I,1}$ as a chosen signal if the current control state is determined to be the first control state; generating an output bandwidth signal $G_{I+1}$ such that an output frequency of the output bandwidth signal $G_{I+1}$ is equal to a sum of an input frequency of the input bandwidth signal $G_I$ and a first tone frequency of the first tone signal $T_{I,1}$, if the current control state is determined to be the first control state; selecting the second tone signal $T_{I,2}$ as the chosen signal if the current control state is determined to be the second control state; and generating the output bandwidth signal $G_{I+1}$ such that the output frequency of the output bandwidth signal $G_{I+1}$ is equal to a difference between a second tone frequency of the second tone signal $T_{I,2}$ and the input frequency of the input bandwidth signal $G_I$, if the current control state is determined to be the first control state; determining if additional multiplier operations are required; incrementing I by 1 and repeating the performing of the (I+1)$^{th}$ multiplier operation and the determining if additional multiplier operations are required if additional multiplier operations are required; and setting the output bandwidth signal $G_{I+1}$ as an operational output if no additional multiplier operations are required.

The frequency-shifted signal may be shifted by 90 degrees in phase from the base signal.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

FIG. 5 is a block diagram of a bandwidth multiplying circuit of FIG. 1, according to a fourth disclosed embodiment;

FIG. 6 is a block diagram of a bandwidth multiplying circuit of FIG. 1, according to a fifth disclosed embodiment;

FIG. 7 is a block diagram of a bandwidth multiplying circuit of FIG. 1, according to a sixth disclosed embodiment;

FIG. 12 is a table illustrating a binary tree of states, where each state defines the set of tone signals to be used for all of the bandwidth multiplying circuits, according to a disclosed embodiment;

FIG. 28 is a flow chart showing a transceiver operation according to a disclosed embodiment; and FIG. 29 is a flow chart showing a transceiver operation according to a disclosed embodiment.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, may be supported with or in integrated circuits (ICs), such as dynamic random access memory (DRAM) devices, static random access memory (SRAM) devices, or the like. In particular, they may be implemented using CMOS or bipolar or field effect transistors. It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs will be limited to the essentials with respect to the principles and concepts used by the exemplary embodiments.

Programmable Waveform Generator

Figure 1:
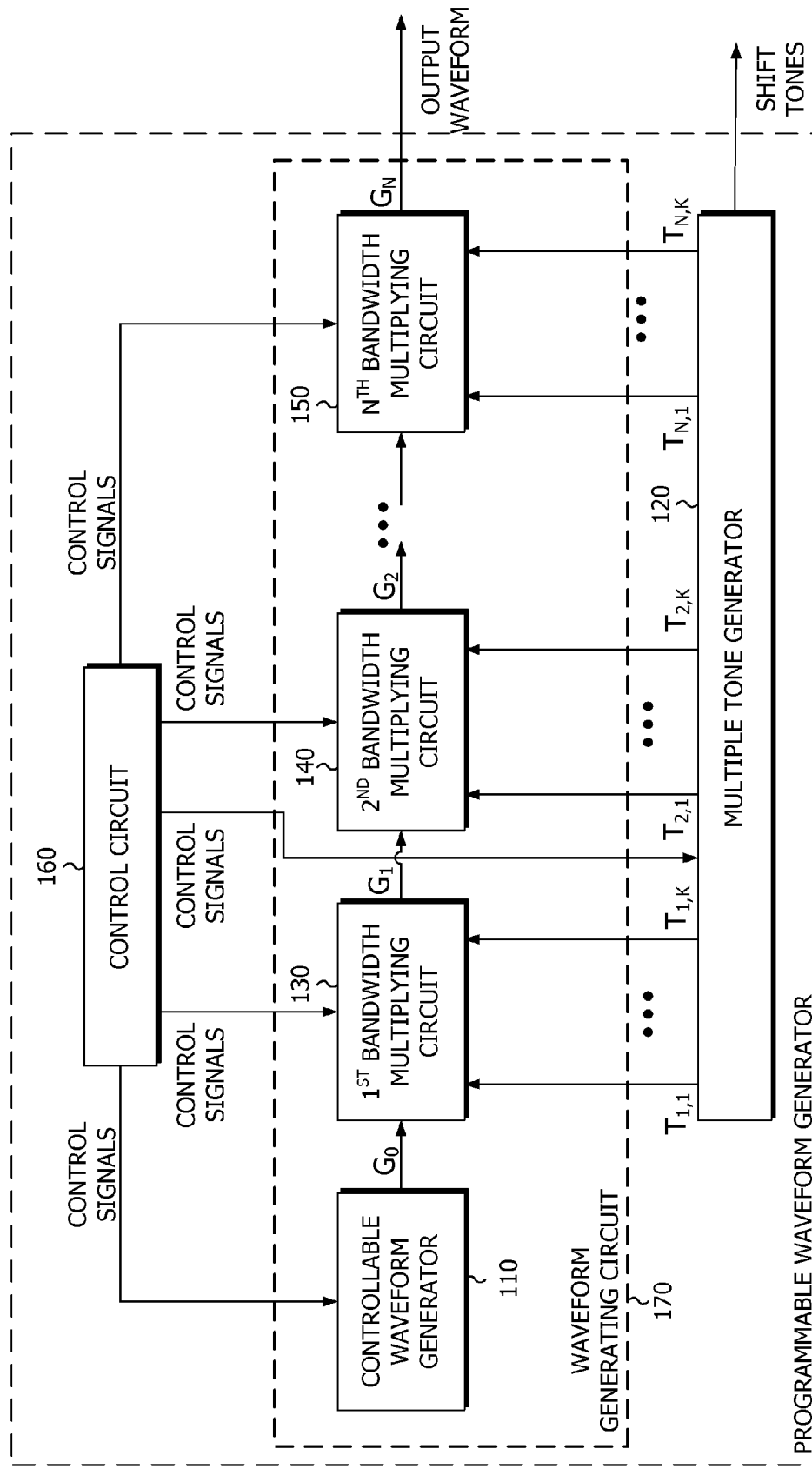
FIG. 1 is a block diagram of a programmable waveform generator according to a disclosed embodiment.

FIG. 1 is a block diagram of a programmable waveform generator 100 according to a disclosed embodiment. As shown in FIG. 1, the programmable waveform generator 100 includes a controllable waveform generator 110, a multiple-tone generator 120, first through $N^{th}$ bandwidth-multiplying circuits 130, 140, 150, and a control circuit 160. The controllable waveform generator 110, and first through $N^{th}$ bandwidth-multiplying circuits 130, 140, 150 can be collectively referred to as a waveform generating circuit 170.

The controllable waveform generator 110 provides an initial bandwidth signal $G_0$ that can contain energy across an initial frequency bandwidth from a low initial bandwidth border to a high initial bandwidth border. In one disclosed embodiment, the initial frequency bandwidth is 1 GHz, ranging from 450 MHz to 1.45 GHz. However, alternate embodiments can use different values for the bandwidth and can have differing bandwidth borders.

In one disclosed embodiment, the controllable waveform generator 110 can be a direct digital synthesizer (DDS). However, in alternate embodiments this could be a waveform playback from random access memory (RAM) through a digital-to-analog converter (DAC), or any circuit that can change frequencies and/or sweep across a frequency bandwidth at a speed sufficient for the desired use.

The multiple-tone generator 120 operates to generate a plurality of tone signals $T_{1,1}, \ldots, T_{N,K}$, each having a different frequency. The tones are selected to simultaneously meet several criteria. One criteria is to choose frequencies to eliminate or mitigate bleed through and higher order harmonics. For example, one would not want a tone used to make $G_1$, to be within the operating bandwidth of $G_1$, because of bleed through across the mixer. Similarly, one would not want to allow any overlap between the input band and the output band. For example $G_1$ should be in a band that allows energy in $G_0$ to be easily filtered out. Also, overlapping harmonic content should be avoided. For example, a $2^{nd}$ or $3^{rd}$ harmonic of $G_0$ should not fall in the band of $G_1$, so they can also be easily filtered out. Overlapping higher order terms should also be avoided. For example the third harmonic of a chosen tone signal, should not mix with any harmonic from the input band, to generate a signal that cannot be easily filtered out of the output band. For example, a harmonic of $T_{1,1}$ when mixed with a harmonic in $G_0$, should not fall into the $G_1$ band. In applications where it is desirable to have continuous frequency sweeps, a pair of tone frequencies must be related to each other by Equation (1).

In some embodiments, the multiple-tone generator 120 may also operate to generate other tones required by the device. For example, the multiple-tone generator 120 may generate one or more shift tones that are used in some embodiments to perform frequency-shifting operations.

The first bandwidth-multiplying circuit 130 accepts the initial bandwidth signal $G_0$, having an initial frequency bandwidth, and two or more of the tone signals from the multiple-tone generator 120 and generates a first bandwidth signal $G_1$ that has a first bandwidth that is greater than the initial frequency bandwidth. For example, in one disclosed embodiment, the first bandwidth-multiplying circuit 130 accepts two of the tone signals related by Equation (1) and generates a first bandwidth signal $G_1$ that has a first bandwidth that is exactly twice the initial frequency bandwidth of signal $G_0$.

The second bandwidth-multiplying circuit 140 accepts the first bandwidth signal $G_1$, having a first frequency bandwidth, and two or more of the tone signals from the multiple-tone generator 120 and generates a second bandwidth signal $G_2$ that has a second bandwidth that is greater than the first frequency bandwidth. For example, in one disclosed embodiment, the second bandwidth-multiplying circuit 130 accepts two of the tone signals related by Equation (1) and generates a second bandwidth signal $G_2$ that has a second bandwidth that is exactly twice the first bandwidth of signal $G_1$. In this embodiment, the second frequency bandwidth is four times the initial frequency bandwidth.

The $N^{th}$ bandwidth-multiplying circuit 150 accepts an $(N-1)^{th}$ bandwidth signal and two or more of the tone signals from the multiple-tone generator 120 and generates an $N^{th}$ bandwidth signal that has an $N^{th}$ bandwidth that is greater than the $(N-1)^{th}$ frequency bandwidth. For example, in one disclosed embodiment (where N=3), the $N^{th}$ bandwidth-multiplying circuit 150 accepts two of the tone signals and generates a third bandwidth signal that has a third bandwidth that is twice the second frequency bandwidth of the second bandwidth signal. In this embodiment, the third frequency bandwidth is eight times the initial frequency bandwidth. In the case where each of the bandwidth multiplying circuits uses two tones related by Equation (1), the bandwidth of the final output signal $G_N$ is $2^N$ times the initial bandwidth signal $G_0$.

In various embodiments, the number of bandwidth-multiplying circuits 130, 140, 150 can vary. Although three bandwidth-multiplying circuits 130, 140, 150 are shown in FIG. 1, there can be more or fewer in alternate embodiments, depending upon the needs of the device using the programmable waveform generator 100. In its simplest form, the programmable waveform generator 100 can include a single bandwidth-multiplying circuit 130. Alternate forms can include two, three, or more than three, as needed.

The control circuit 160 provides control signals to control the operation of the controllable waveform generator 110 and the first through $N^{th}$ bandwidth multiplication circuits 130, 140, 150.

Figure 13:
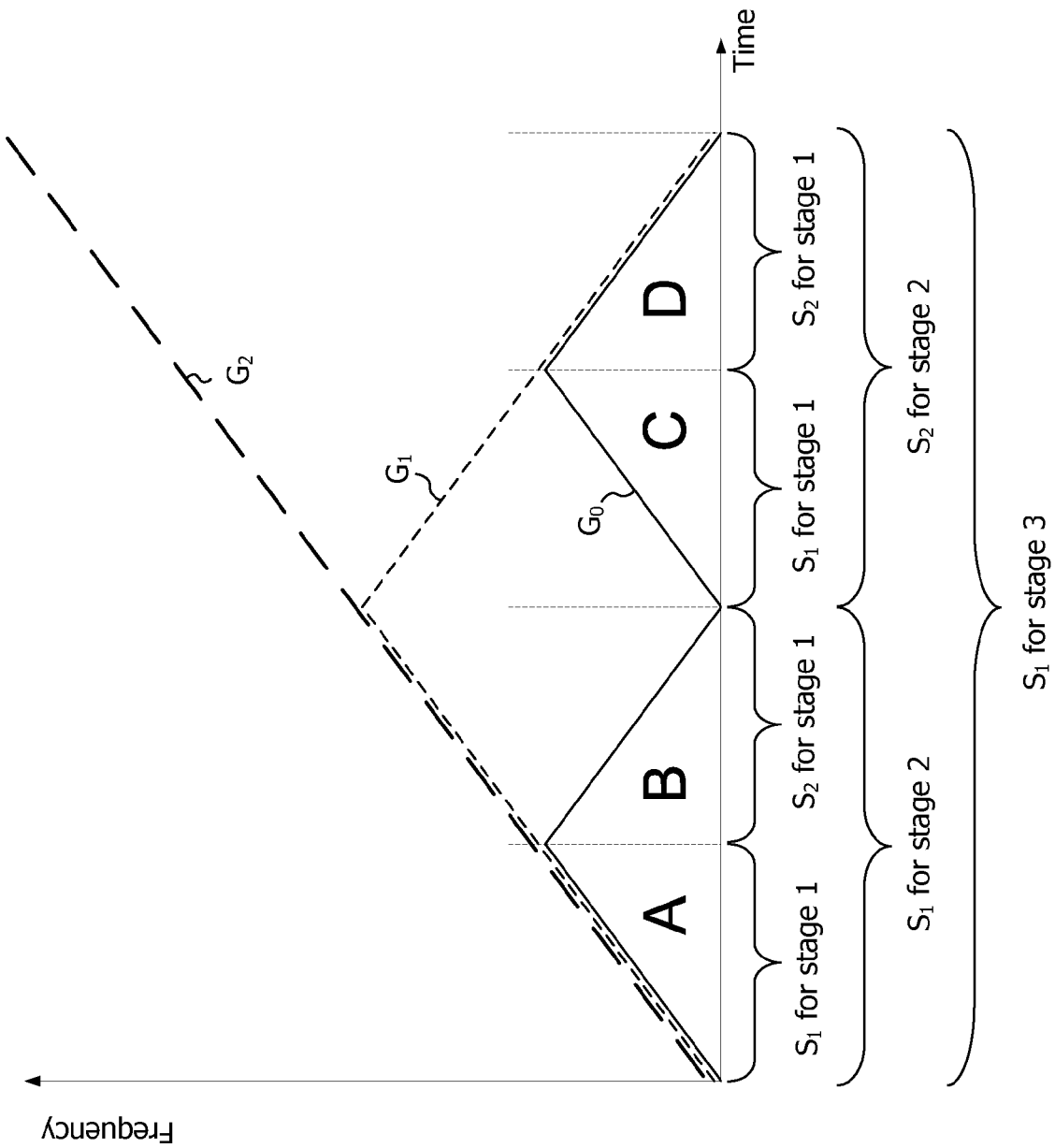
FIG. 13 is a graph showing the mapping between the controllable waveform generator and control state, and the 1$^{st}$ bandwidth multiplying circuit, and the 2$^{nd}$ bandwidth multiplying circuit for two-tone bandwidth multiplying circuits, according to a disclosed embodiment.

In one disclosed embodiment in which N is 3 and K is 2, the initial signal band is 150 MHz to 400 MHz, and the tone generator provides eight tone signals, $T_{1,1}, \ldots, T_{4,2}$, with the frequencies set forth in Table 1, which also shows the progression of wider and wider frequency bands at each stage, illustrated graphically in FIG. 13. In this embodiment, each bandwidth multiplying circuit 130, 140, 150 receives two of the tone signals. With only 8 tones, the bandwidth has been extended However, alternate embodiments with different values of N and K can generate more or fewer tone signals. And these signals can be at different frequencies, as required by the needs of the application that the programmable waveform generator 100 is used with. In this alternate case, while the output band may not be contiguous, the bandwidth growth is still exponential as each stage expands upon expansion made in the previous stage.

TABLE 1

Exemplary Tone Signals and Frequencies

| Tone Signal | Frequency | Input Range | Output Range |
|---|---|---|---|
| $T_{1,1}$ | 1.35 GHz | $G_0$ = 0.15-0.4 | $G_1$ = 1.5-1.75 |
| $T_{1,2}$ | 2.15 GHz | $G_0$ = 0.4-0.15 | $G_1$ = 1.75-2 |
| $T_{2,1}$ | 5.5 GHz | $G_1$ = 1.5-2 | $G_2$ = 7-7.5 |
| $T_{2,2}$ | 10 GHz | $G_1$ = 2-1.5 | $G_2$ = 7.5-8 |
| $T_{3,1}$ | 2 GHz | $G_2$ = 7-8 | $G_3$ = 9-10 |
| $T_{3,2}$ | 18 GHz | $G_2$ = 8-7 | $G_3$ = 10-11 |
| $T_{4,1}$ | 4 GHz | $G_2$ = 9-11 | $G_3$ = 13-15 |
| $T_{4,2}$ | 26 GHz | $G_2$ = 11-9 | $G_3$ = 15-17 |

In this disclosed embodiment, each bandwidth multiplying circuit 130, 140, 150 receives the same number of tone signals (i.e., two). In alternate embodiments, however, this need not be the case. Different bandwidth multiplying circuits 130, 140, 150 can receive different numbers of tone signals.

The Bandwidth Multiplying Circuit

FIGS. 2 to 8 show various embodiments of the bandwidth multiplying circuits 130, 140, 150 of FIG. 1, according to disclosed embodiments. Similar elements within these embodiments operate in a similar manner. Therefore, the operation of every element will not be separately described for each embodiment. Also, for the sake of simplicity of disclosure, an embodiment of the first bandwidth multiplying circuit 130 will be shown. It should be understood, however, that this embodiment applies equally to the other bandwidth multiplying circuits 140, 150 as well.

Figure 2:
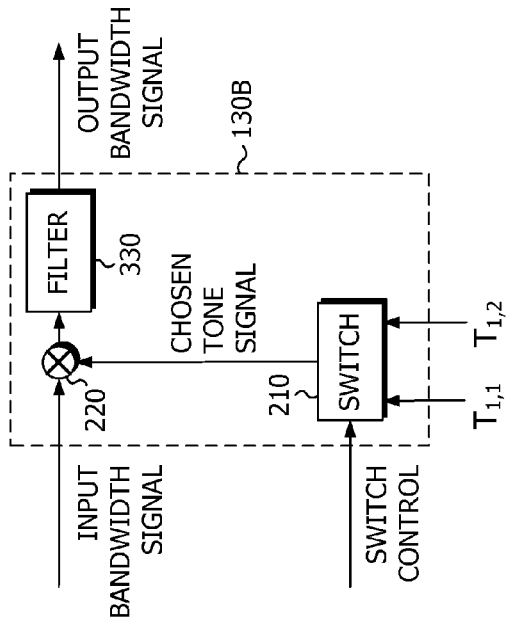
FIG. 2 is a block diagram of a bandwidth multiplying circuit of FIG. 1, according to a first disclosed embodiment.

FIG. 2 is a block diagram of a bandwidth multiplying circuit 130A of FIG. 1, according to a first disclosed embodiment. As shown in FIG. 2, the bandwidth multiplying circuit 130A includes a switch 210 and a multiplier 220.

The switch 210 receives two tone signals $T_{1,1}$ and $T_{1,2}$, and selects one of these two tone signals as a chosen tone signal based on a switch control signal. The switch control signal indicates a control state of the bandwidth multiplying circuit 130A, as described below.

The multiplier 220 mixes the chosen tone signal ($T_{1,1}$ or $T_{1,2}$) and an input bandwidth signal to generate an output bandwidth signal. This mixing operation is performed such that the frequency of the output bandwidth signal is a function of the frequency of the chosen tone signal ($T_{1,1}$ or $T_{1,2}$) and the frequency of the input bandwidth signal. The combined bandwidth of the output band created by $T_{1,1}$ and the output band created by $T_{1,2}$ is wider than the input bandwidth.

In the disclosed embodiment in which two tone signals $T_{1,1}$ and $T_{1,2}$ are used, and contiguous operation is desired, the relationship between the frequency of the output bandwidth signal, the frequency of the chosen tone signal ($T_{1,1}$ or $T_{1,2}$), and the frequency of the input bandwidth signal is determined by Equations (1) through (4), depending upon whether the first tone signal $T_{1,1}$ or the second tone signal $T_{1,2}$ is the chosen tone signal.

To force the transition point to be transient free, the frequencies of the tone signals $T_{I,1}$ and $T_{I,2}$ are related according to equation (1), $$F(T_{I,2}) = F(T_{I,1}) + 2L_I + 2B_I, \quad (1)$$

Where $F(T_{1,2})$ is the frequency of the second tone signal $T_{1,2}$, $F(T_{1,1})$ is the frequency of the first tone signal $T_{1,1}$, $L_I$ is the lowest frequency that the input bandwidth signal takes on the $I^{th}$ stage, and $B_I$ is the bandwidth of the input signal at the $I^{th}$ stage.

It should be noted that in these equations, $T_{I,1}$ can be considered to have a negative frequency, i.e., $$-\infty < F(T_{I,x}) < \infty. \quad (2)$$

If the first tone signal $T_{1,1}$ is the chosen tone signal, then the frequency of the output bandwidth is determined according to equation (3), $$F(O) = F(T_{I,1}) + F(I), \quad (3)$$

where F(O) is the frequency of the output bandwidth signal, F(I) is the frequency of the input bandwidth signal.

If, however, the second tone signal $T_{1,2}$ is the chosen tone signal, then the frequency of the output bandwidth signal is determined according to equation (4), $$F(O) = F(T_{I,2}) - F(I). \quad (4)$$

The addition versus subtraction difference between equations (3) and (4) captures the effect of high-side versus low side mixing, or using an upper sideband versus a lower sideband.

The RF switches that choose the tone signals, such as switch 210, can operate at extremely fast speeds—a few billionths of a second. As a result, the output frequency can be hopped across the entire extended frequency range at speeds that are essentially equal to the core switching speed of the controllable waveform generator.

Figure 3:
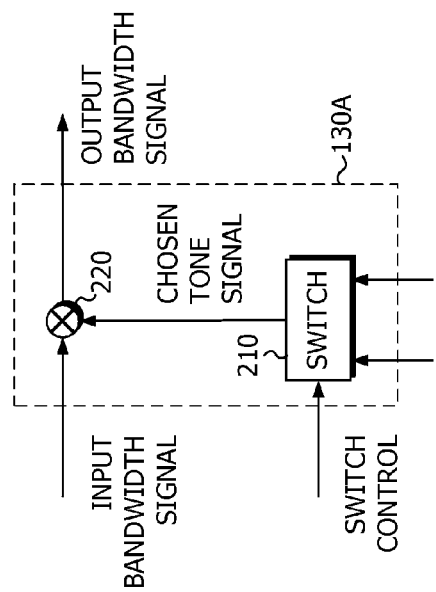
FIG. 3 is a block diagram of a bandwidth multiplying circuit of FIG. 1, according to a second disclosed embodiment.

FIG. 3 is a block diagram of a bandwidth multiplying circuit 130B of FIG. 1, according to a second disclosed embodiment. As shown in FIG. 3, the bandwidth multiplying circuit 130B is similar to the bandwidth multiplying circuit 130A of FIG. 2, except that the output of the mixer 220 is passed through a filter 330 before it is provided as the output bandwidth signal. The filter is designed to pass the desired frequency band and reject energy outside of this band, such as harmonic and bleed through signals.

Figure 4:
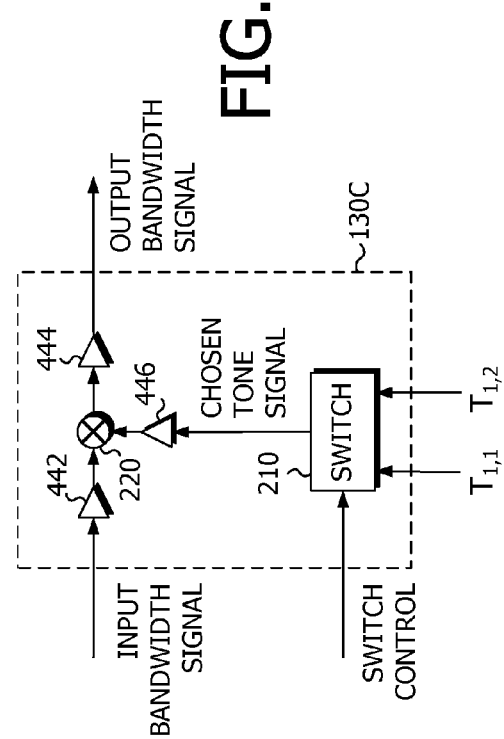
FIG. 4 is a block diagram of a bandwidth multiplying circuit of FIG. 1, according to a third disclosed embodiment.

FIG. 4 is a block diagram of a bandwidth multiplying circuit 130C of FIG. 1, according to a third disclosed embodiment. As shown in FIG. 4, the bandwidth multiplying circuit 130C is similar to the bandwidth multiplying circuit 130A of FIG. 2, except that amplifiers are included. The amplifiers are chosen to reduce reflection coefficients into and out of the mixer, and to make up for losses.

FIG. 5 is a block diagram of a bandwidth multiplying circuit 130D of FIG. 1, according to a fourth disclosed embodiment. As shown in FIG. 5, the bandwidth multiplying circuit 130D is similar to the bandwidth multiplying circuits 130B and 130C of FIGS. 3 and 4, except that uses both the amp lifers and the filter.

FIG. 6 is a block diagram of a bandwidth multiplying circuit 130E of FIG. 1, according to a fifth disclosed embodiment. As shown in FIG. 6, the bandwidth multiplying circuit 130E is similar to the bandwidth multiplying circuit 130A of FIG. 2, except that includes a phase shifter to allow the phase relationship between the inputs to be adjusted. This phase shifter can be implemented by all standard methods, such as trimming transmission line lengths, or by a voltage controlled phase shift network, or could functionally be covered by adjusting the phase of the phase locked oscillator producing the tone signal, relative to its reference.

While the phase shifters as shown in FIG. 6 do not affect the frequency, they are useful to allow adjustment of the phase between the tone signals so that the phase of the output signal is not changed at the point where a state change happens. For example, at the transition from state 1 to state 2, where the controllable waveform generator is at its highest frequency, and where only the $1^{st}$ bandwidth multiplying circuit is changing its chosen tone signal, phase shifter 1,1 could be adjusted so that the output signals phase does not change at the switchover point. Similarly, the phase shifters in each bandwidth multiplying circuit can be adjusted such that the phase is consistent across all state transitions. Alternatively, the phase of the controllable waveform generator could be programmed to offset any phase difference between the state changes. This approach has the advantage of eliminating the phase shifters, but has the disadvantage of potentially causing ringing in a filter within the controllable waveform generator. Another alternative is to use a tone generator capable of shifting the relative phases of the signals, such as that shown in FIG. 9.

FIG. 7 is a block diagram of a bandwidth multiplying circuit 130F of FIG. 1, according to a sixth disclosed embodiment. As shown in FIG. 7, the bandwidth multiplying circuit 130F is similar to the bandwidth multiplying circuits 130D and 130E of FIGS. 5 and 6, except that it uses both the phase shifter, and multiple filters. Occasionally, one or both of these cases occur:

TABLE 2

Generation of Harmonics and Spurious Signals

| Case | Description |
|---|---|
| 1 | harmonics and spurious signals generated when $T_{1,1}$ is selected fall in the output band produced with $T_{2,1}$ is selected |
| 2 | harmonics and spurious signals generated when $T_{2,1}$ is selected fall in the output band produced with $T_{1,1}$ is selected |

By using separate filters for each tone signal, a higher purity signal can be produced because the filters are nearly half the bandwidth of a filter that covers the entire output frequency band, and they can eliminate the harmonics associated with Case 1 and Case 2.

Switch 740 and 741 could be implemented as a single double-pole double-throw (DPDT) switch, or a pair of single-pole double-throw (SPDT) switches. Switch 740 could also be replaced with a splitter such that both filters 730 and 735 received the signal regardless of switch position. Using the splitter has the disadvantage of more loss and the advantage of lower transients.

Figure 8:
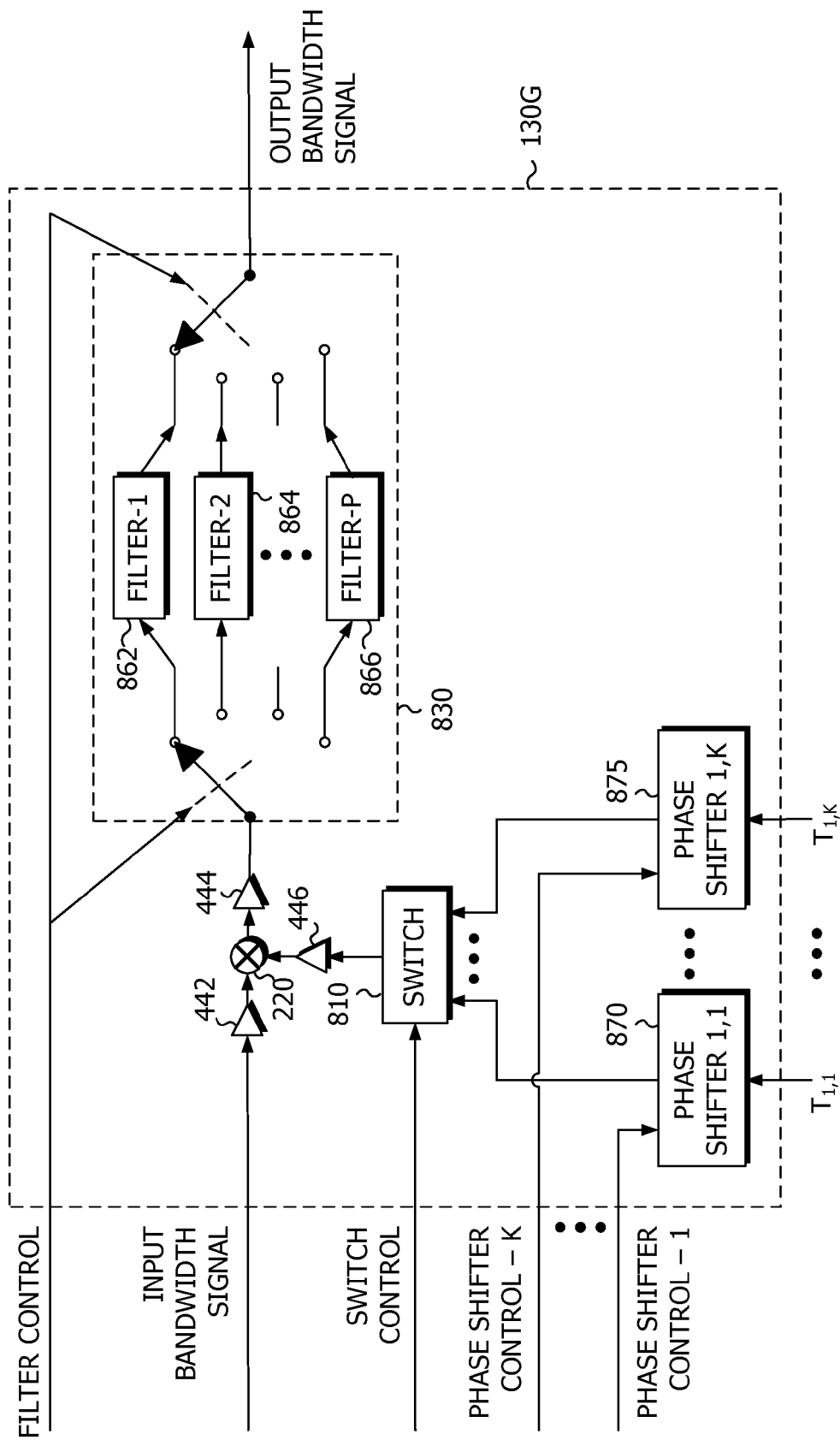
FIG. 8 is a block diagram of a bandwidth multiplying circuit of FIG. 1, according to a seventh disclosed embodiment.

FIG. 8 is a block diagram of a bandwidth multiplying circuit 130G of FIG. 1, according to a seventh disclosed embodiment. As shown in FIG. 8, the bandwidth multiplying circuit 130G is similar to the bandwidth multiplying circuit 130F of FIG. 7, with two changes. The embodiment of FIG. 8 uses a plurality of tone signals $T_{1,1}, \ldots, T_{1,K}$, passing through a plurality of phase shifters 870, . . . , 875, to the inputs of a multiple-input-single-output switch 810. Also, in the embodiment of FIG. 8, a filter circuit 830 includes a plurality of selectable filters 862, 864, 866. A filter control signal is provided to select one of the plurality of selectable filters 862, 864, 866 to filter the output of the mixer 220 before it is provided as an output bandwidth signal. The number of filters P and the number of phase shifters K may be the same or may be different. In some embodiments one or more of the phase shifters 870, . . . , 875 can be eliminated, allowing the associated tone signal to be supplied directly to the switch 210.

In some applications, it is advantageous to add additional bands to the output signal rather than adding another bandwidth multiplying circuit. One advantage can be a reduced part count because the required bandwidth does not need another bandwidth multiplying circuit stage. Another advantage may be that the frequency ranges required to implement another bandwidth multiplying circuit stage requires the use of much more expensive parts.

Dual-Output Bandwidth Multiplying Circuit

Figure 20:
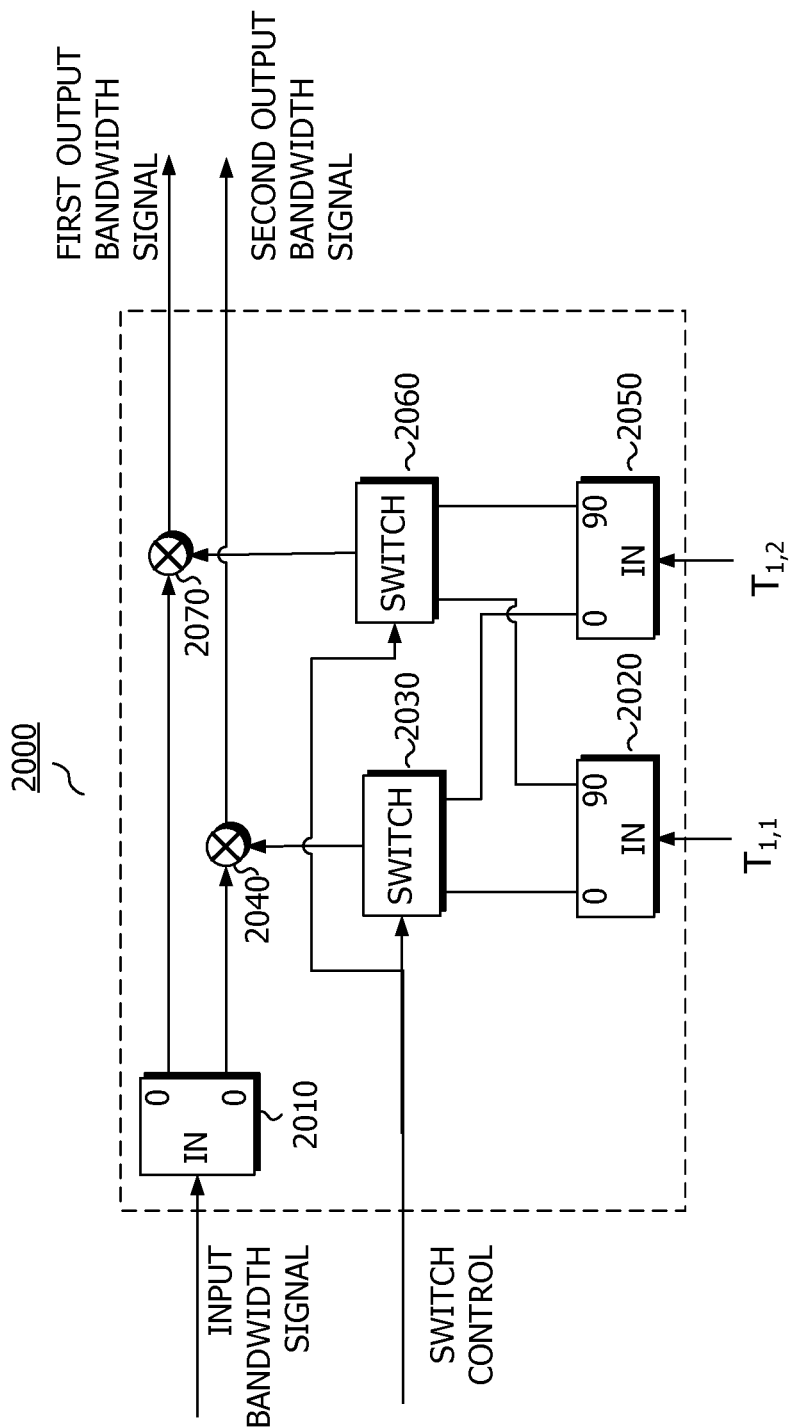
FIG. 20 is a block diagram of a dual-output bandwidth multiplying circuit according to a first disclosed embodiment.
Figure 21:
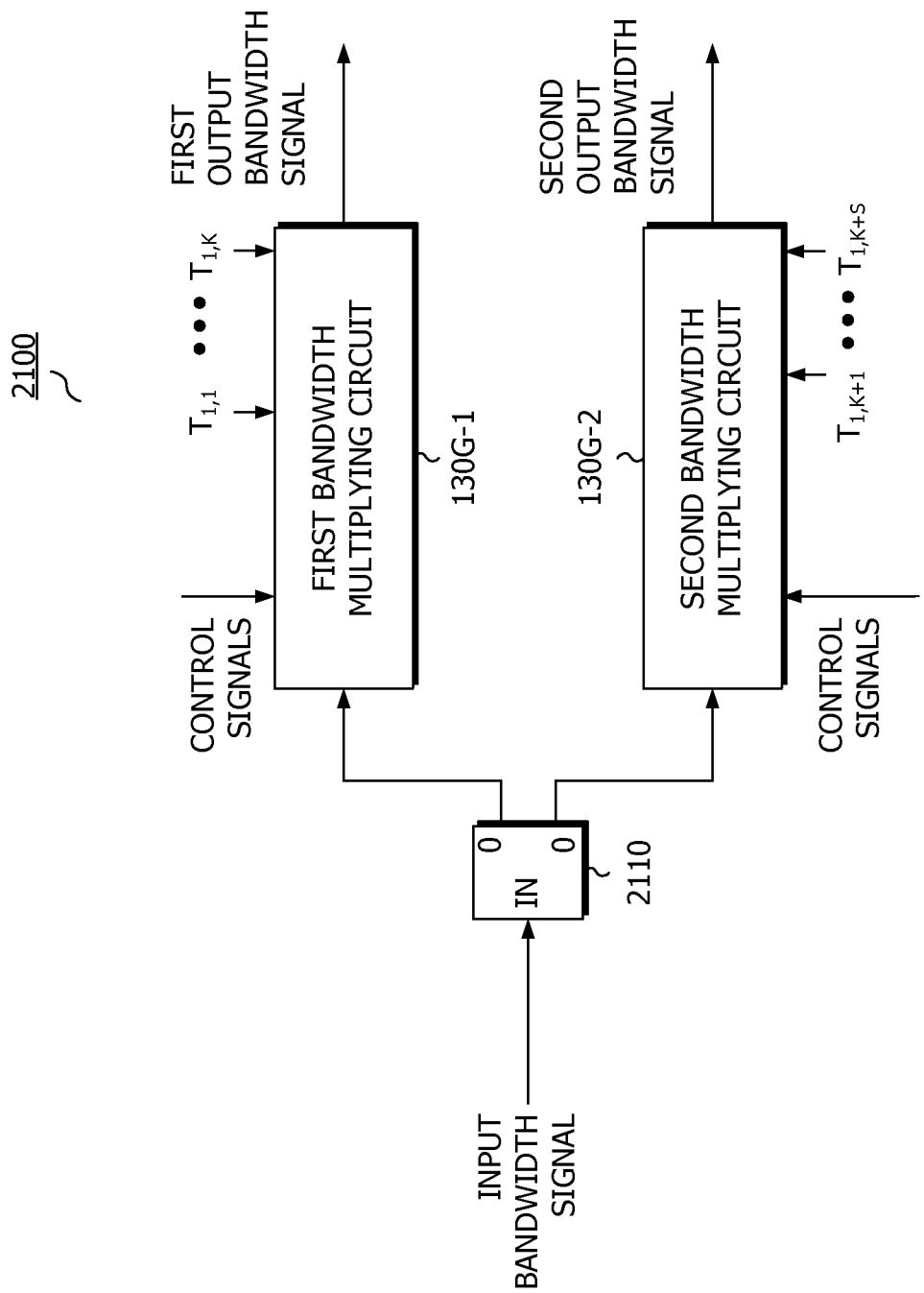
FIG. 21 is a block diagram of a dual-output bandwidth multiplying circuit according to a second disclosed embodiment.

FIGS. 20 and 21 show embodiments of a dual-output bandwidth multiplying circuits 2000, 2100 according to disclosed embodiments. These dual-output bandwidth multiplying circuits 2000, 2100 are similar to the bandwidth multiplying circuit 130, 140, 150 of FIG. 1, except that they have two outputs instead of just one. Similar elements in these circuits operate in a similar manner. Therefore, the operation of every element will not be separately described for each embodiment.

FIG. 20 is a block diagram of a dual-output bandwidth multiplying circuit 2000 according to a first disclosed embodiment. As shown in FIG. 20, dual-output bandwidth multiplying circuit 2000 includes a splitter 2010, a first 90-degree shifter 2020, a first switch 2030, a first mixer 2040, a second 90-degree shifter 2050, a second switch 2060, and a second mixer 2070.

The splitter 2010 receives the input bandwidth signal and splits it into first and second copies of the input bandwidth signal.

The first 90-degree shifter 2020 receives a first tone signal $T_{1,1}$ and outputs a first shifted copy of the first tone signal $T_{1,1}$ and a second shifted copy of the first tone signal $T_{1,1}$ that are separated from each other by 90 degrees.

The first switch 2030 receives the first shifted copy of the first tone signal $T_{1,1}$ and the first shifted copy of the second tone signal $T_{1,2}$ and selects one of the two as a first chosen tone based on one or more switch control signals.

The first mixer 2040 receives the first copy of the input bandwidth signal and the first chosen tone, and mixes the two to generate a first output bandwidth signal.

The second 90-degree shifter 2050 receives a second tone signal $T_{1,2}$ and outputs a first shifted copy of the second tone signal $T_{1,2}$ and a second shifted copy of the second tone signal $T_{1,2}$ that are separated from each other by 90 degrees.

The second switch 2060 receives the second shifted copy of the first tone signal $T_{1,1}$ and the second shifted copy of the second tone signal $T_{1,2}$ and selects one of the two as a second chosen tone based on the one or more switch control signals.

The second mixer 2070 receives the second copy of the input bandwidth signal and the second chosen tone, and mixes the two to generate a second output bandwidth signal.

In this embodiment, the first and second output bandwidth signals will both have twice the bandwidth of the input bandwidth signal. However, the phases of the first and second output bandwidth signals will be separated from each other by 90 degrees.

In some embodiments the phases of the first and second 90-degree shifter can be synchronized with each other, while in others they may remain unsynchronized with respect to each other.

FIG. 21 is a block diagram of a dual-output bandwidth multiplying circuit 2100 according to a first disclosed embodiment. As shown in FIG. 21, the dual-output bandwidth multiplying circuit 2100 includes a splitter 2010, a first bandwidth multiplying circuit 130G-1 and second bandwidth multiplying circuit 130G-2. The first and second first bandwidth multiplying circuits 130G-1 and 130G-2 are each similar to the bandwidth multiplying circuit 130G of FIG. 8. As a result, a detailed description of the elements in the first and second first bandwidth multiplying circuits 130G-1 and 130G-2 will not be provided.

FIG. 21 is similar to FIG. 20 in that it shows the use of two mixers to produce two output signals, where the first mixer is contained in a first bandwidth multiplying circuit 130G-1, and where the second mixer is contained in a second bandwidth multiplying circuit 130G-2. The first bandwidth multiplying circuit 130G-1 and second bandwidth multiplying circuit 130G-2 receive the input bandwidth signal via splitter 2110. The first bandwidth multiplying circuit 130G-1 generates a first output bandwidth signal and the second bandwidth multiplying circuit 130G-2 generates a second output bandwidth signal.

In this disclosed embodiment, the first bandwidth multiplying circuit 130G-1 and the second bandwidth multiplying circuit 130G-2 can employ the same or a different number of filters 862, 864, 866 in the filter circuit 830. Also, first tone signals $T_{1,1}, \ldots T_{1,K}$ used by the first bandwidth multiplying circuit 130G-1 and second tone signals $T_{1,K+1}, \ldots T1_{,K+S}$ used by the second bandwidth multiplying circuit 130G-2 can be the same or different signals. In varying embodiments K can be equal to S or different from S.

The dual-output bandwidth multiplying circuits 2000, 2100 can be used in place of any of the bandwidth multiplying circuits 130, 140, 150 of FIG. 1. In one particular embodiment, the $N^{th}$ bandwidth multiplying circuit 150 is replaced with a dual-output bandwidth multiplying circuits 2000, 2100, transforming a single-output waveform generating circuit into a dual-output waveform generating circuit. However, alternate embodiments can employ a single-output bandwidth multiplying circuit 2000, 2100 at any stage in a waveform generating circuit, as needed by design parameters for any given device.

In addition, although dual-output bandwidth multiplying circuits are shown, alternate embodiments could be multiple-output bandwidth multiplying circuits, having more than two outputs.

The Tone Generator

Figure 9:
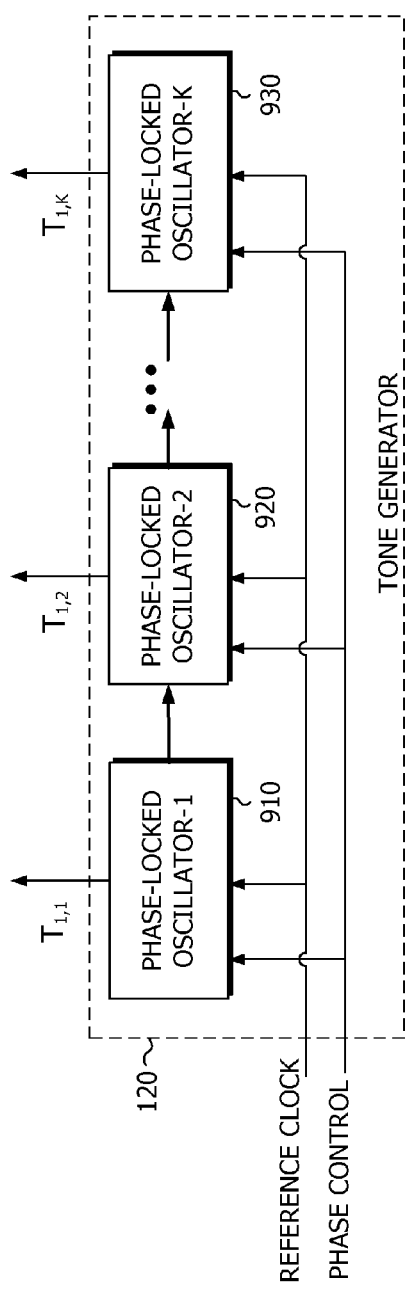
FIG. 9 is a block diagram of the multiple-tone generator of FIG. 1 according to one disclosed embodiment.

FIG. 9 is a block diagram of the multiple-tone generator 120 of FIG. 1 according to one disclosed embodiment. As shown in FIG. 9, there is a bank oscillators 910, 920, 930, that generate all the required tone signals. All the oscillators are all phase-locked to a common reference. A control signal can be used to adjust the relative phases between the tones. Multiple required frequencies could be derived from a single, or a few, phase-locked-loop (PLL) synthesizers under the control of the controller, as long as the required switching speed was not too demanding.

Figure 10:
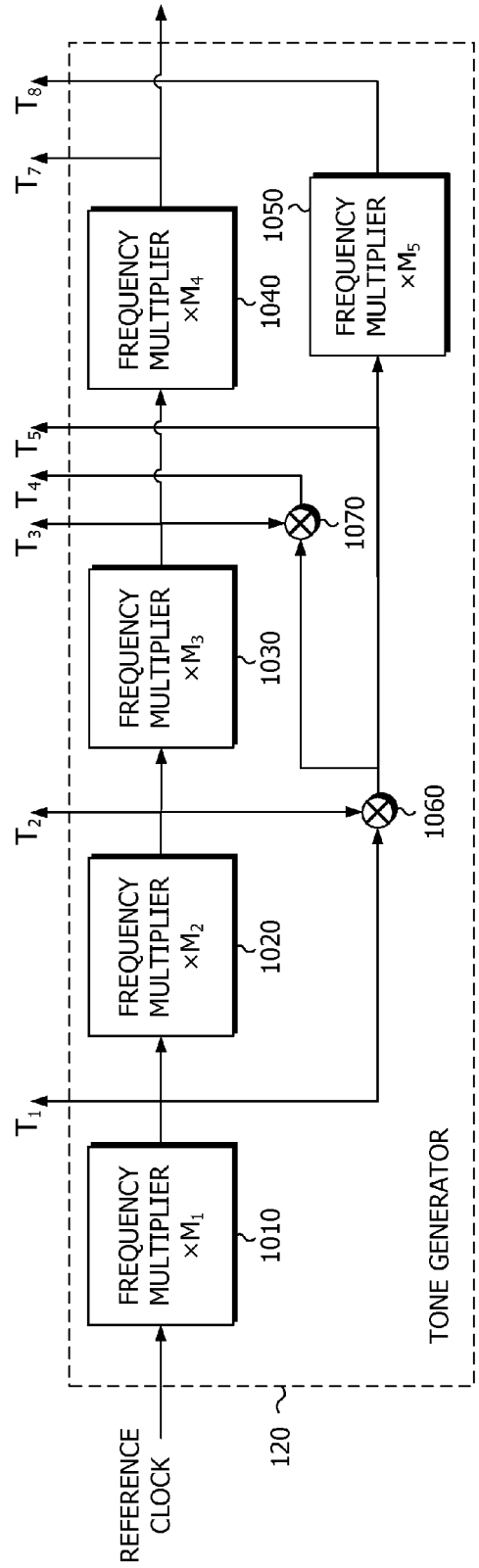
FIG. 10 is a block diagram of the multiple-tone generator of FIG. 1 according to another disclosed embodiment.

FIG. 10 is a block diagram of the multiple-tone generator 120 of FIG. 1 according to a disclosed embodiment. As shown in FIG. 10, all the required tone signals are derived from the common reference by using a network of multipliers (1010, 1020, 1030, 1040, 1050) and mixers (1060, 1070). A network comprised of a mixture of phase locked oscillators, and multipliers and mixers could also be used for the tone generator.

Method of Operation

Figure 11:
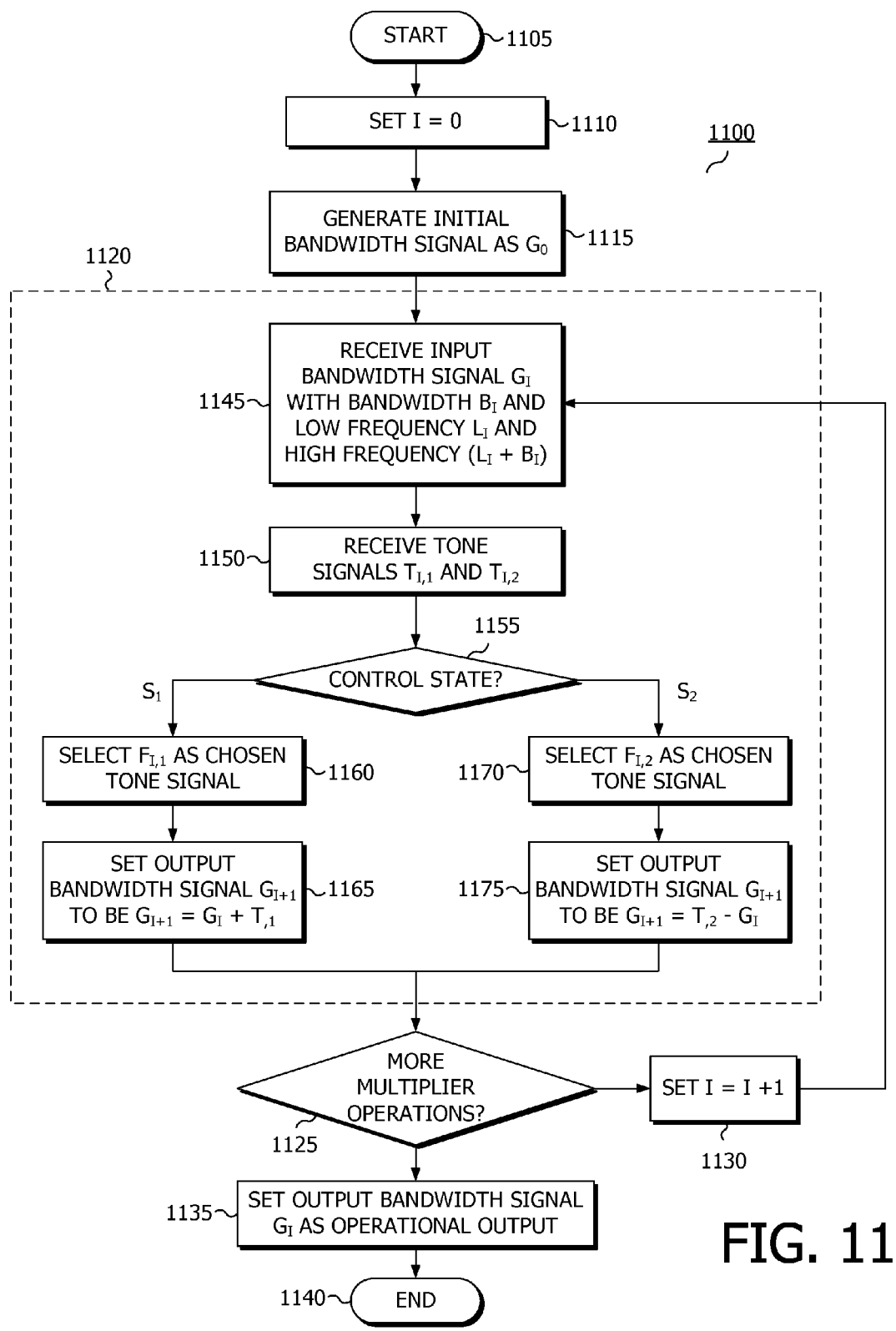
FIG. 11 is a flow chart showing a waveform generation operation according to a disclosed embodiment.

FIG. 11 is a flow chart showing a waveform generation operation 1100 according to a disclosed embodiment. As shown in FIG. 10, after the operation starts 1105, a value of I is set to 0. (1110) In the waveform generation operation I is an index for the individual bandwidth multiplier circuit operations.

Once I is set to 0, the waveform generation operation generates an initial bandwidth signal, which it sets as $G_0$. (1115) This initial bandwidth signal is thus used as an input bandwidth signal for the first multiplier operation.

The current multiplier operation then performs an $(I+1)^{th}$ multiplier operation. (1120) An $(I+1)^{th}$ multiplier operation receives an input bandwidth signal $G_I$, and generates an output bandwidth signal $G_{(I+1)}$ (e.g., during a first multiplier operation, I=0, the input bandwidth signal is $G_0$ and the output bandwidth signal is $G_1$).

Once the multiplier operation 1120 is completed, the waveform generation operation 1100 determines whether there are anymore multiplier operations to be performed. (1125) If there are, it increments I, i.e., sets I=I+1 (1130), and repeats the multiplier operation 1120.

If, however, there are no more multiplier operations 1120 to be performed (1125), then the waveform generation operation 1100 sets the current output bandwidth signal $G_I$ as the operational output (1135), and ends operation. (1140)

One embodiment of the multiplier operation 1120 will now be described in detail below.

An $(I+1)^{th}$ multiplier operation 1120 begins by receiving a input bandwidth signal $G_I$, which has a bandwidth $B_I$, a low frequency $L_I$, and a high frequency of $(L_I+B_I)$. (1145) The multiplier operation 1120 then receives two tone signals $T_{I,1}$ and $T_{I,2}$, each with a corresponding frequency. (1150)

Then the multiplier operation 1120 determines a current control state (e.g., state $S_1$ or state $S_2$). (1155) This control state indicates which of the two tone signals should be selected.

Based on the value of the controls state, the multiplier operation 1120 then selects a tone signal and sets and output bandwidth signal $G_{I+1}$. If the control state is a first control state $S_1$, then the tone signal $T_{I,1}$ is selected as a chosen tone signal (1160) and the frequency of the output bandwidth signal $G_{I+1}$ is set to be the sum of the frequency of the input bandwidth signal $G_I$ and the frequency of the chosen tone signal $T_{I,1}$ (1165), as shown above by Equation (3), i.e., $$F(G_{I+1})=F(G_I)+F(T_{I,1}) \tag{5}$$

If, however, the control state is a second control state $S_2$, then the tone signal $T_{I,2}$ is selected as a chosen tone signal (1170) and the frequency of the output bandwidth signal $G_{I+1}$ is set to be the difference between the frequency of the chosen tone signal TI,2 and the frequency of the input bandwidth signal GI (1175), as shown above by Equation (4), i.e., $$F(G_{I+1})=F(T_{I,2})-F(G_I) \tag{6}$$

It should be noted that in these equations, $T_{I,1}$ can be considered to have a negative frequency, as shown above in Equation (2), i.e., $$-\infty F(T_{I,1}) < \infty \quad (7)$$

Furthermore, the frequencies of the tone signals $T_{I,1}$ and $T_{I,2}$ are related according to the following equation:

$$F(T_{I,2}) = F(T_{I,1}) + 2L_I + 2B_I \quad (8)$$

In the embodiment of the multiplier operation 1120 disclosed above, each multiplier operation 1120 employs two tone signals and two corresponding control states. However, this is by way of example only. Alternate embodiments could employ K tone signals and K corresponding control states, where K is an integer greater than 2. In this case, the number and frequencies of the tone signals, as well as the states regarding when to choose them, are set to achieve a desired bandwidth for the output bandwidth signal. Each extra tone will increase the bandwidth of the output bandwidth signal. So by adding additional tones, the bandwidth of the output bandwidth signal will be increased.

In order to achieve this, however, and keep the output continuous, the states for selecting the tones should be chosen to alternate adding a tone to the input signal and subtracting the input signal from a tone. For example, in the disclosed embodiment using two tones for each switch, a first tone is added to the input signal during a first control state, and the input signal is subtracted from the second tone during a second control state. If three tones and three control states were used, the progression could follow the addition and subtraction of the two-tone example, but add another addition operation after the subtraction operation. More operations could be added, so long as they alternate between addition and subtraction. Furthermore, the addition tones should continually increase in frequency and the subtraction tones should continually increase in frequency, so that the output bandwidth signal will also continually increase in frequency.

In addition, the junction of two bandwidth multipliers should always be different operations. For example, if one bandwidth multiplier ends with an addition operation, then the next bandwidth multiplier should begin with a subtraction operation. Likewise, if a bandwidth multiplier ends with a subtraction operation, the next bandwidth multiplier should begin with an addition operation.

FIG. 12 is a table illustrating a binary tree of states for an embodiment in which two tone signals are used for each switch, where each state defines the set of tone signals to be used for all of the bandwidth multiplying circuits, according to a disclosed embodiment. The table shows a binary progression of values for a system using only three bandwidth multiplying circuits as an example that could be extended to any number of bandwidth multiplying circuits. There is no requirement that the state labeling be in any particular order, only that the states allow the desired frequencies to be generated. The state table shown in FIG. 12 could be applied to the example frequency set given in Table 1 above.

FIG. 13 is a graph showing the mapping between the control state, the controllable waveform generator, the $1^{st}$ bandwidth multiplying circuit, and the $2^{nd}$ bandwidth multiplying circuit for two-tone bandwidth multiplying circuits, according to a disclosed embodiment. For clarity, the plots of FIG. 13 have been shifted to all start at near zero frequency at the left side of the plot. In practice, the waveforms would be offset vertically according to any particular design. For any desired output frequency, the graph shows what state to select and what the frequency needs to be generated by the controllable waveform generator. The RF switches that choose the tone signals can operate at extremely fast speeds (a few billionths of a second). As a result, the output frequency can be hopped across the entire extended frequency range at speeds that are essentially equal to the core switching speed of the controllable waveform generator. This graph also illustrates how the mapping allows the controllable waveform generator to have a smooth change in frequency, with no abrupt discontinuities or steps, and generate a smooth continuous sweep across the entire extended frequency range.

In particular, FIG. 13 shows the initial bandwidth signal $G_0$, and the output bandwidth signals $G_1$ and $G_2$ from the first and second bandwidth multiplying circuits 130 and 140 of FIG. 1. As shown in FIG. 13, the first output bandwidth signal $G_1$ has twice the bandwidth of the initial bandwidth signal $G_0$; and the second output bandwidth signal $G_2$ has twice the bandwidth of the first output bandwidth signal $G_1$, and four times the bandwidth of the initial bandwidth signal $G_0$. This can easily be extended for additional bandwidth multiplying circuits.

Figure 14:
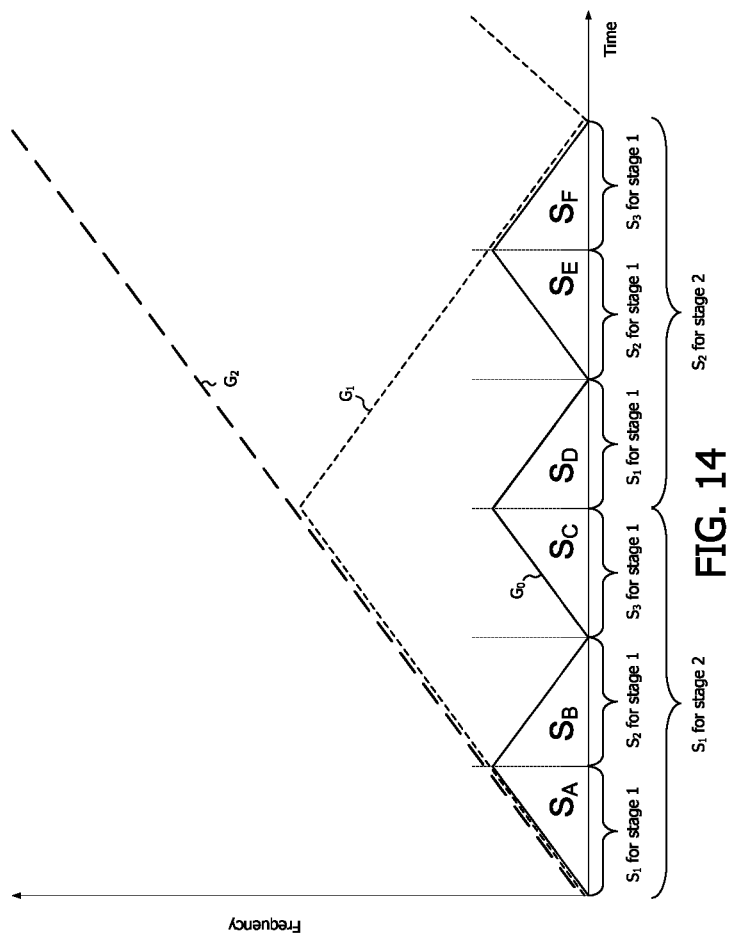
FIG. 14 is a graph showing the mapping between the controllable waveform generator and control state, and the 1$^{st}$ bandwidth multiplying circuit, and the 2$^{nd}$ bandwidth multiplying circuit for three-tone bandwidth multiplying circuits, according to a disclosed embodiment.

FIG. 14 is a graph showing the mapping between the control state, the controllable waveform generator, the $1^{st}$ bandwidth multiplying circuit, and the $2^{nd}$ bandwidth multiplying circuit for three-tone bandwidth multiplying circuits, according to a disclosed embodiment. For clarity, the plots of FIG. 14 have been shifted to all start at near zero frequency at the left side of the plot. In practice, the waveforms would be offset vertically according to any particular design. For any desired output frequency, the graph shows what state to select and what the frequency needs to be generated by the controllable waveform generator. The RF switches that choose the tone signals can operate at extremely fast speeds (a few billionths of a second). As a result, the output frequency can be hopped across the entire extended frequency range at speeds that are essentially equal to the core switching speed of the controllable waveform generator. This graph also illustrates how the mapping allows the controllable waveform generator to have a smooth change in frequency, with no abrupt discontinuities or steps, and generate a smooth continuous sweep across the entire extended frequency range.

Unlike the embodiment of FIG. 13, this embodiment employs three tones in each bandwidth multiplier. As a result, each bandwidth multiplier has three control states corresponding to three separate operations. Furthermore, since there are an odd number of states in the first and second bandwidth multipliers, they will be configured opposite to each other with respect to addition and subtraction operations. The states $S_A$, $S_B$, and $S_C$ for the first bandwidth multiplier (i.e., the first stage), will correspond to an addition, a subtraction, and an addition operation, respectively. In contrast, the states $S_D$, $S_E$, and $S_F$ for the second bandwidth multiplier (i.e., the second stage), will correspond to a subtraction, an addition, and a subtraction operation, respectively. This will allow for a continuous transition between the first bandwidth multiplier and the second bandwidth multiplier (i.e., between the first and the second stage.

Although the embodiments of FIGS. 13 and 14 both show implementations in which the first and second bandwidth multipliers have the same number of tone inputs, this is by way of example only. The number of tone inputs could be different for some bandwidth multipliers, the same for others, or any suitable combination.

Transceiver Using Single-Output Programmable Waveform Generator

Figure 15:
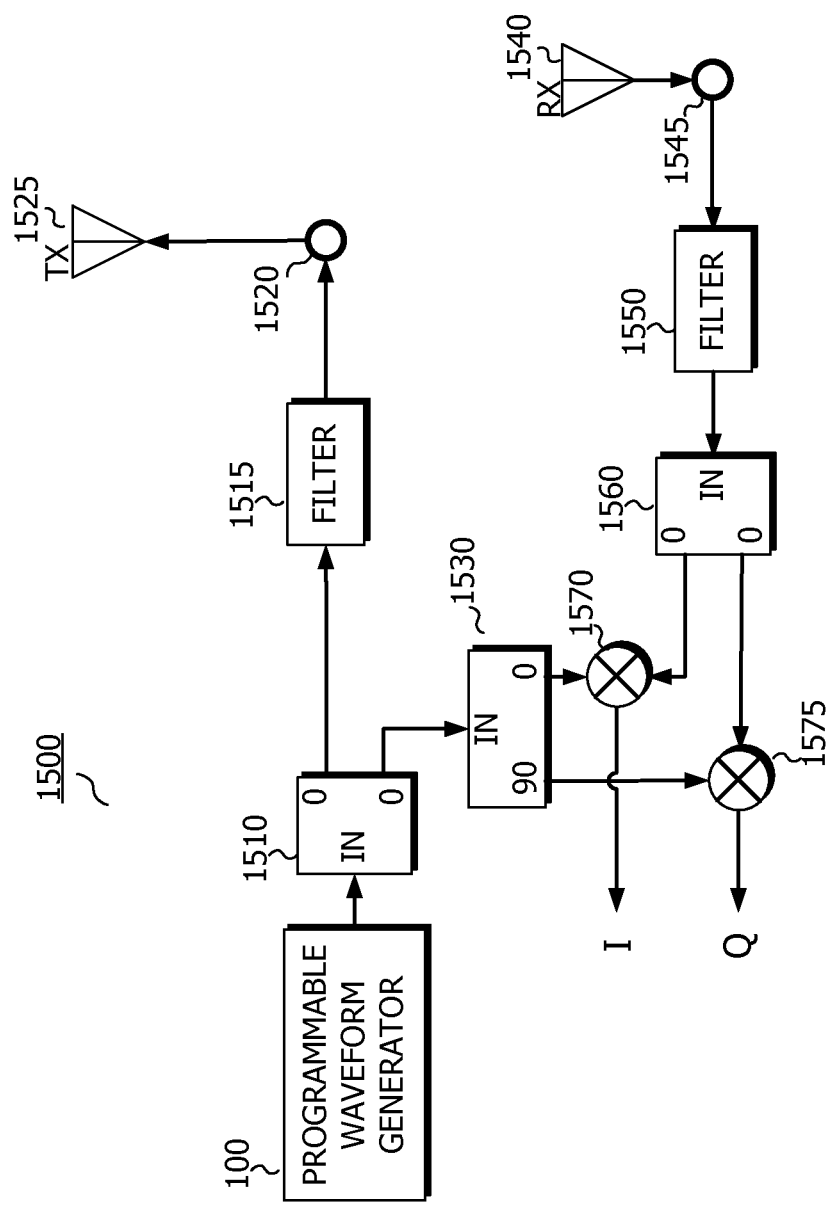
FIG. 15 is a block diagram of a transceiver using the programmable waveform generator of FIG. 1 in a direct conversion vector arrangement according to a disclosed embodiment.

FIG. 15 is a block diagram of a transceiver 1500 using the programmable waveform generator 100 of FIG. 1 in a direct conversion vector arrangement according to a disclosed embodiment. As shown in FIG. 15, the transceiver 1500 includes a programmable waveform generator 100, a first signal splitter 1510, a transmit filter 1515, a transmit port 1520, a transmit antenna 1525, a 90-degree shifter 1530, a receive antenna 1540, a receive port 1545, a receive filter 1550, a second signal splitter 1560, a first mixer 1570, and a second mixer 1575.

The programmable waveform generator 100 operates as described above with respect to FIG. 1. It generates a wideband output waveform as a base signal.

The first signal splitter 1510 receives the base signal from the programmable waveform generator 100 and splits it into first and second copies of the base signal, one of which is sent to the filter 1515, and the other of which is sent to the 90-degree shifter 1530.

The transmit filter 1515 is connected between the first signal splitter 1510 and the transmit port 1520, and typically operates to remove signals from the first copy of the base signal not in the passband of the receiver that the signal is intended for, to generate a filtered base signal. In this way, the transmit filter 1515 reduces interference in a transmitted signal.

The transmit port 1520 receives the filtered base signal, and provides it to the transmit antenna 1525. In alternate embodiments, however, the transmit port 1520 can be connected to any sort of element to which signals could be transmitted, e.g., a device under testing, a speaker, an optical transducer, a sonic transducer, a hydrosonic transducer, etc.

The transmit antenna 1525 operates to transmit the filtered base signal over a transmission medium. This could be a radio antenna or any suitable antenna for sending signals over the transmission medium.

The 90-degree shifter 1530 operates to produce a first shifted signal and a second shifted signal from the base signal. Both of the first and second shifted signals are copies of the base signal. However, the first and second shifted signals are separated from each other in phase by 90 degrees. The relative phases of the first and second shifted signals with respect to the base signal may change is different embodiments, however, so long as they remain separated by 90 degrees from each other. For example, in one embodiment, the phase of the first shifted signal may be the same as the phase of the base signal, while the phase of the second shifted signal is 90 degrees off from the phase of the base signal; in another embodiment, the phase of the first shifted signal may be 90 degrees off from the phase of the base signal, while the phase of the second shifted signal is the same as the phase of the base signal; and in others embodiments, in another embodiment, the first and second shifted signals may both be out phase with the base signal.

The receive antenna 1540 operates to receive a received signal over a transmission medium. This could be a radio antenna or any suitable antenna for receiving signals over the transmission medium.

The receive port 1545 receives the received signal, and provides it to the receive filter 1550. In alternate embodiments, however, the receive port 1545 can be connected to any sort of element from which signals could be received, e.g., a device under testing, a microphone, an optical transducer, a sonic transducer, a hydrosonic transducer, etc.

The receive filter 1550 is connected between the receive port 1545 and the second signal splitter 1560, and typically operates to remove signals not in the passband of the receiver. In this way, the receive filter 1550 reduces interference in the received signal.

The second signal splitter 1560 receives the filtered received signal from the receive filter 1550 and splits it into first and second copies of the filtered received signal, one of which is sent to the first mixer 1570, and the other of which is sent to the second mixer 1575.

The first mixer 1570 operates to mix the first copy of the filtered received signal and the second shift signal to form an in-phase (I) signal. The second mixer 1575 operates to mix the second copy of the filtered received signal and the first shift signal to form a quadrature-phase (Q) signal. These I and Q signals can then be used by a later processor in accordance with the particular implementation. For example, if the device is a radar device, the I and Q signals could be used to generate an image; if the device is a voice transceiver, the I and Q signals could be used to generate sound; if the device is a data transmitter, the I and Q signals could be used to extract transmitted data; etc.

In alternate embodiments either or both of the transmit filter 1515 and the receive filter 1550 can be eliminated. If the transmit filter 1515 is eliminated, the unfiltered base signal is sent directly to the transmit port 1520; and if the receive filter 1550 is eliminated, the unfiltered received signal is sent directly to the second signal splitter 1560.

In alternate embodiments either or both of the first signal splitter 1510 and the second signal splitter 1560 can be eliminated. If the first signal splitter 1510 is eliminated, the output of the programmable waveform generator 100 can be connected directly to the transmit filter 1515 and the 90-degree shifter 1530; and if the second signal splitter 1560 is eliminated, the output of the receive filter 1530 can be connected directly to the first and second mixers 1570 and 1575.

In embodiments where both the transmit filter 1515 and the first signal splitter 1510 are eliminated, the output of the programmable waveform generator 100 can be connected directly to the transmit port 1520. Likewise, in embodiments where both the receive filter 1550 and the second signal splitter 1560 are eliminated, the receive port 1545 can be connected directly to the first and second mixers 1570 and 1575.

Figure 16:
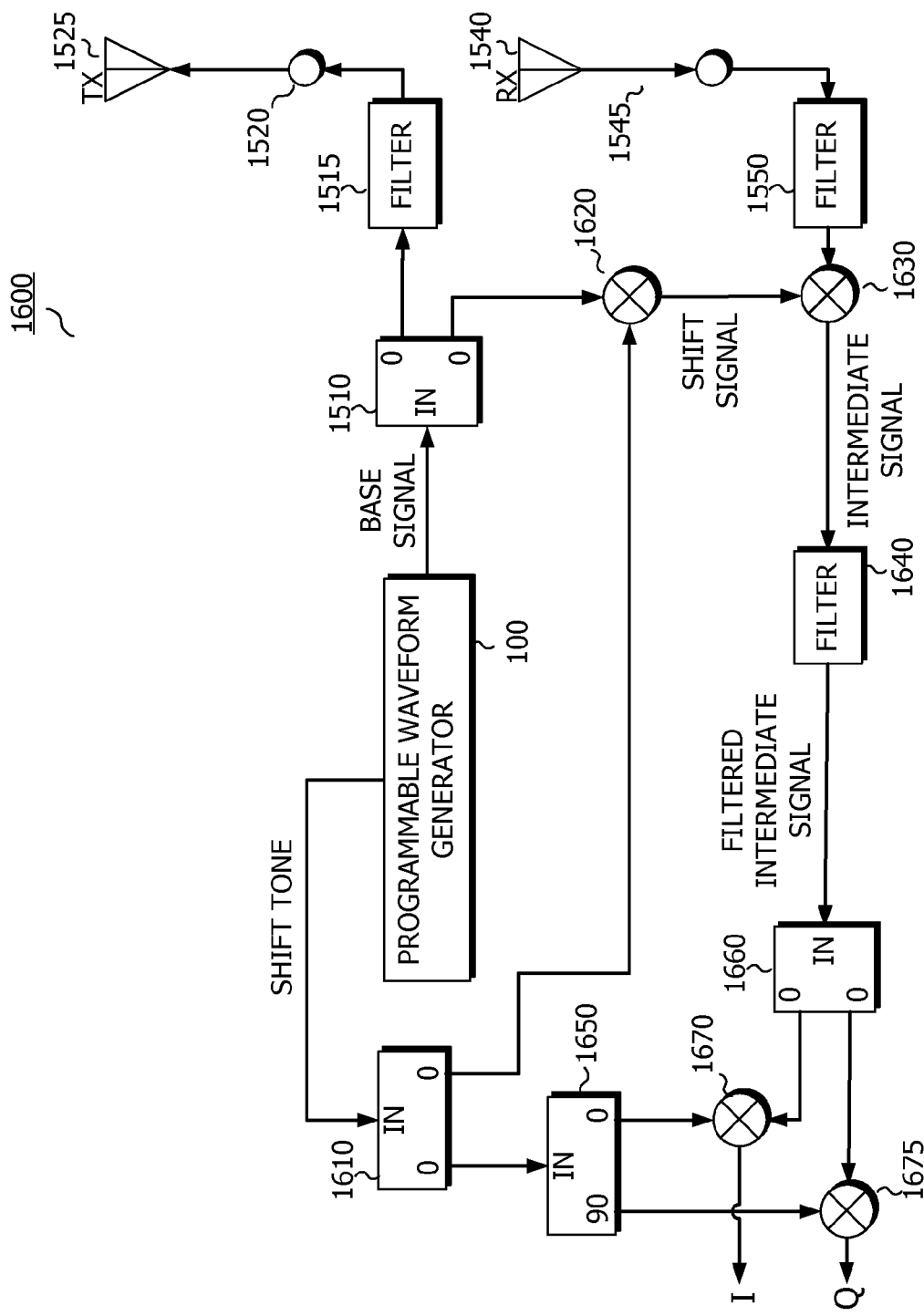
FIG. 16 is a block diagram of a transceiver using the programmable waveform generator of FIG. 1 in a single conversion vector arrangement according to a first disclosed embodiment.

FIG. 16 is a block diagram of a transceiver 1600 using the programmable waveform generator 100 of FIG. 1 in a single conversion vector arrangement according to a first disclosed embodiment. As shown in FIG. 16, the transceiver 1600 includes a programmable waveform generator 100, a first signal splitter 1510, a second signal splitter 1660, a third signal splitter 1610, a transmit filter 1515, a transmit port 1520, a transmit antenna 1525, a receive antenna 1540, a receive port 1545, a receive filter 1550, a first mixer 1670, a second mixer 1675, a third mixer 1620, and a fourth mixer 1630, an intermediate frequency (IF) filter 1640, and a 90-degree shifter 1650.

The programmable waveform generator 100 operates to generate an output bandwidth signal with a bandwidth greater than the input bandwidth signal, as described above with respect to FIG. 1. The first signal splitter 1510, the transmit filter 1515, the transmit port 1520, the transmit antenna 1525, the 90-degree shifter 1530, the receive antenna 1540, the receive port 1545, and the receive filter 1550 operate as described above with respect to FIG. 15.

The third signal splitter 1610 receives a shift tone from the programmable waveform generator 100 and splits it into a first copy of the shift tone and a second copy of the shift tone.

The third mixer 1620 mixes the first copy of the shift tone and the second copy of the base signal to generate a local oscillator signal.

The fourth mixer 1630 then mixes the local oscillator signal with the filtered received signal to generate an intermediate signal having a constant IF frequency. The frequency of the tone signal is selected to provide an intermediate signal having a desired IF frequency. In certain embodiments, the frequency of the shift tone is selected to keep the IF frequency relatively low compared to the frequency range of the received signal. However, the exact IF frequency used can be varied as needed by the requirements of the current design.

The IF filter 1640 operates to filter the intermediate signal. Since the intermediate signal is at a constant IF frequency, the IF filter can generally be sharper than the receive filter 1550. In some embodiments, the desirable qualities of the IF filter can be further improved by selecting the shift tone to keep the IF frequency relatively low compared to the frequencies of the received signal.

The second signal splitter 1660 receives the filtered intermediate signal from the IF filter 1640 and splits it into first and second copies of the filtered intermediate signal, one of which is sent to the first mixer 1670, and the other of which is sent to the second mixer 1675.

The 90-degree shifter 1650 receives the second copy of the shift tone and provides a first shifted shift tone and a second shifted shift tone. The first and second shifted shift tones are both copies of the shift tone, but they are separated from each other by 90 degrees in phase.

The first mixer 1670 operates to mix the first copy of the filtered intermediate signal and the second shifted shift tone to form an in-phase (I) signal. The second mixer 1675 operates to mix the second copy of the filtered intermediate signal and the first shifted shift tone to form a quadrature-phase (Q) signal. These I and Q signals can then be used by a later processor in accordance with the particular implementation. For example, if the device is a radar device, the I and Q signals could be used to generate an image; if the device is a voice transceiver, the I and Q signals could be used to generate sound; if the device is a data transmitter, the I and Q signals could be used to extract transmitted data; etc.

In operation, the transceiver 1600 of FIG. 16 uses the shift tone to shift the received signal to a constant intermediate frequency so that it can be filtered by the IF filter 1640. Then, once the IF filtering operation is done, the transceiver 1600 again uses the shift tone to shift the received signal back to its proper frequency range.

Figure 17:
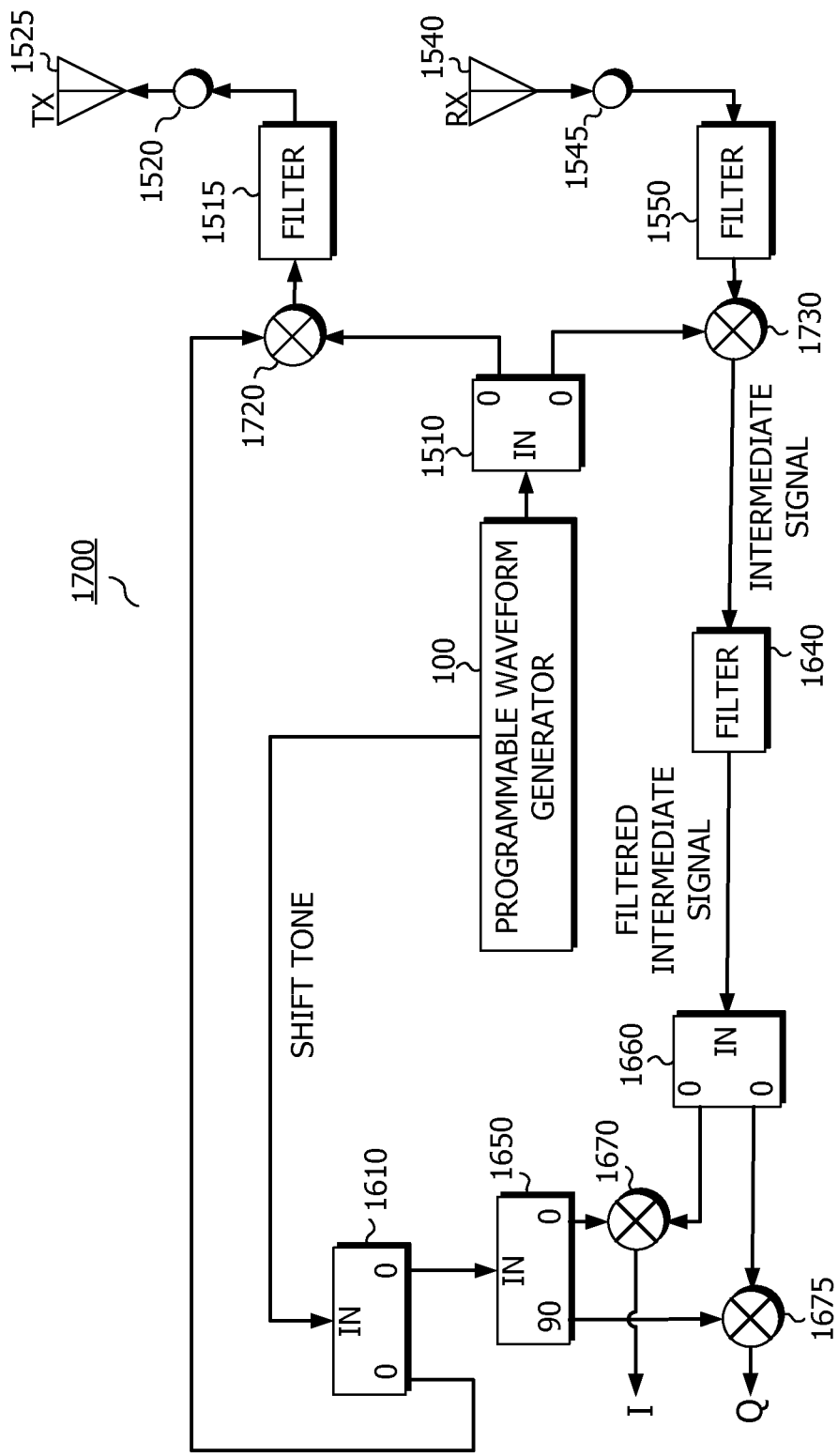
FIG. 17 is a block diagram of a transceiver using the programmable waveform generator of FIG. 1 in a single conversion vector arrangement according to a second disclosed embodiment.

FIG. 17 is a block diagram of a transceiver 1700 using the programmable waveform generator 100 of FIG. 1 in a single conversion vector arrangement according to a second disclosed embodiment. As shown in FIG. 17, the transceiver 1700 includes a programmable waveform generator 100, a first signal splitter 1510, a second signal splitter 1660, a third signal splitter 1610, a transmit filter 1515, a transmit port 1520, a transmit antenna 1525, a receive antenna 1540, a receive port 1545, a receive filter 1550, a first mixer 1670, a second mixer 1675, a third mixer 1720, and a fourth mixer 1730, an intermediate frequency (IF) filter 1640, and a 90-degree shifter 1650.

The programmable waveform generator 100 operates to generate an output bandwidth signal with a bandwidth greater than the input bandwidth signal, as described above with respect to FIG. 1. The first signal splitter 1510, the transmit filter 1515, the transmit port 1520, the transmit antenna 1525, the receive antenna 1540, the receive port 1545, the receive filter 1550, operate as described above with respect to FIG. 15. The second signal splitter 1660, the third signal splitter 1610, the first mixer 1670, the second mixer 1675, the intermediate frequency (IF) filter 1640, and the 90-degree shifter 1650 operate as described above with respect to FIG. 16.

The third mixer 1720 is located between the first signal splitter 1510 and the transmit filter 1515, and operates to mix the first copy of the shift tone and the first copy of the base signal to generate a signal for transmission.

The fourth mixer 1730 mixes the second copy of the base signal shift signal with the filtered received signal to generate an intermediate signal having a constant IF frequency. Again, The frequency of the tone signal is selected to provide an intermediate signal having a desired IF frequency. It is simply applied to the transmitted signal at an earlier part of the transmission (i.e., at the third mixer 1720 in the transceiver 1700, rather than at the fourth mixer 1630 in the transceiver 1630). In certain embodiments, the frequency of the shift tone is selected to keep the IF frequency relatively low compared to the frequency range of the received signal. However, the exact IF frequency used can be varied as needed by the requirements of the current design.

In operation, the transceiver 1700 of FIG. 17 operates in a manner similar to that shown above for the transceiver 1600 of FIG. 16, except for two major differences. First, while in the transceiver 1600, the programmable waveform generator 100 makes the transmitted signal directly, the transceiver 1700 mixes the output of the programmable waveform generator 100 with the shift tone to generate the transmitted signal. Second, while the transceiver 1600 mixes the output of the programmable waveform generator 100 with the shift tone to make a local oscillator signal to convert the received signal into IF, the transceiver 1700 uses the output of the programmable waveform generator 100 directly as a local oscillator signal for converting the received signal to IF.

Figure 18:
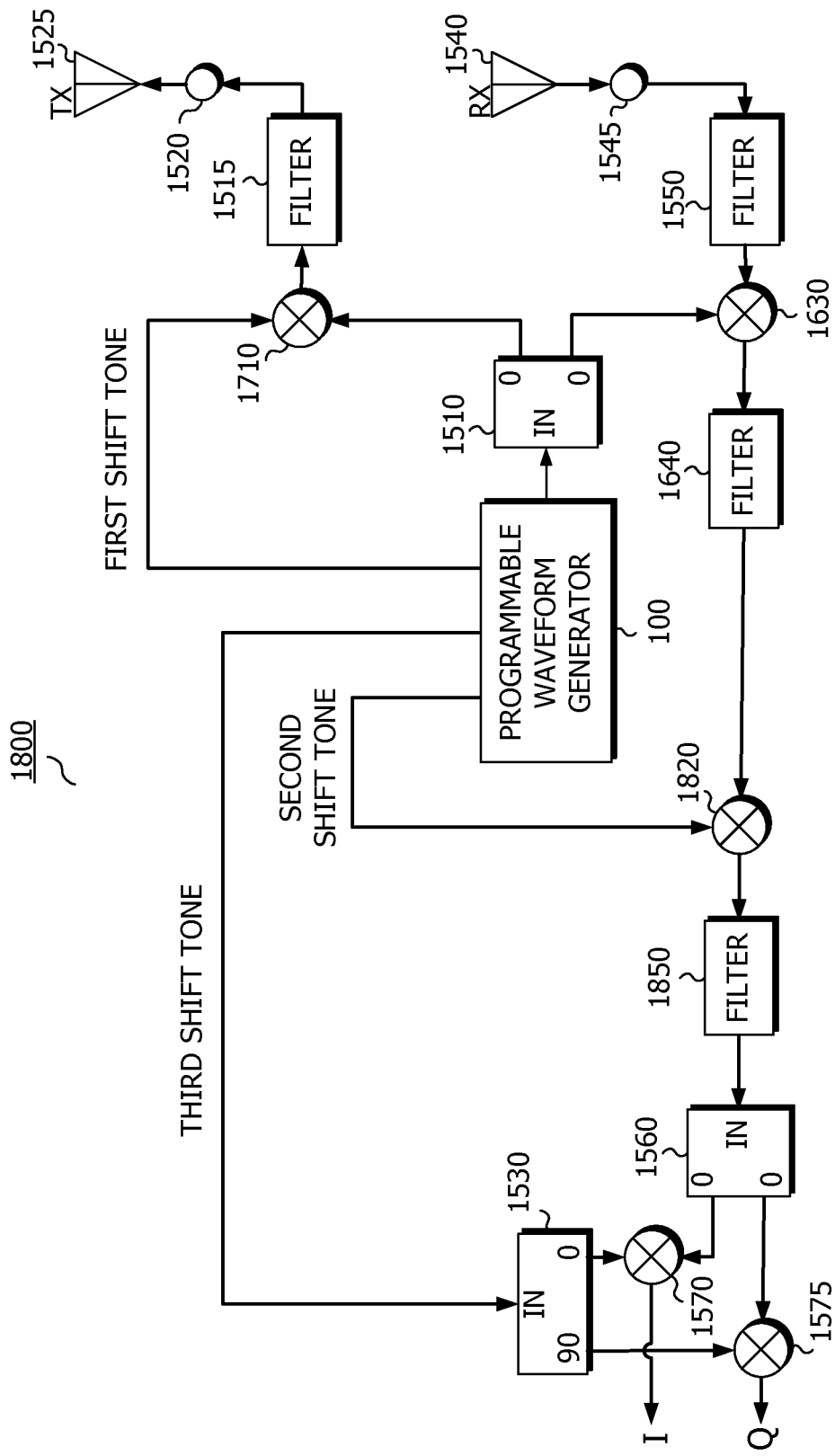
FIG. 18 is a block diagram of a transceiver using the programmable waveform generator of FIG. 1 in a dual conversion vector arrangement according to a first disclosed embodiment.

FIG. 18 is a block diagram of a transceiver using the programmable waveform generator of FIG. 1 in a dual conversion vector arrangement having an I and Q output according to a first disclosed embodiment. As shown in FIG. 18, the transceiver 1800 includes a programmable waveform generator 100, a first splitter 1510, a transmit filter 1515, a transmit port 1520, transmit antenna 1525, a 90 degree splitter 1530, a first mixer 1575, a second mixer 1570, a third splitter 1560, a first intermediate frequency (IF) filter 1640, a third mixer 1630, a receive filter 1550, a receive port 1545, and a receive antenna 1540, a second intermediate filter 1850, a fourth mixer 1710, and a fifth mixer 1820.

In the transceiver 1800, the programmable waveform generator is configured to produce four signals, an output bandwidth signal, a first shift tone signal, a second shift tone signal, and a third shifted tone signal.

The output bandwidth signal is passed through the splitter 1510. The first output of splitter 1510 is coupled to the fourth mixer 1710, where it is mixed with the first shift tone signal. The output of the fourth mixer 1710 is filtered by the transmit filter 1515, conducted to the transmit port 1520, where it is coupled to the transmit antenna 1525.

The received signal is coupled from the antenna 1540 through the receive port 1545 to the filter 1550 to produce a filtered received signal. The mixer 1630 is configured to mix the filtered received signal with the second output of splitter 1510 to produce a first IF received signal. The first IF received signal is filtered by the first IF filter 1640. The output signal from the first IF filter 1640 is mixed with the second shift tone signal in the mixer 1820 to produce a second IF signal. The second IF filter 1850 filters the second IF signal to produce a filtered second IF signal. The splitter 1560 is configured to receive the filtered second IF signal and generate a pair of output signals that are in phase with each other.

The splitter 1530 receives the third shift tone signal and produces a 0-degree third shift tone signal, and a 90 degree third shift tone signal. The first mixer 1575 is configured to mix the 90 degree third shift tone signal with the second IF signal to produce an in-phase signal (I). The second mixer 1570 is configured to mix the 0-degree third shift tone signal with the second IF signal to generate a quadrature phase signal (Q). These I and Q signals can then be used by a later processor in accordance with the particular implementation.

The frequency of the first, second, and third shift tone signals are chosen to allow easy-to-implement first and second IF filters to be manufactured and to prevent spurious responses due to harmonics. The frequency of the first shift tone signal must nominally match the center frequency of the first IF filter 1640. The center frequency of the second IF filter 1850 must nominally match the frequency of the third shift tone frequency. The sum or difference between the second shift tone signal and the first shift tone signal, must nominally match the center frequency of the second IF filter 1850.

Figure 19:
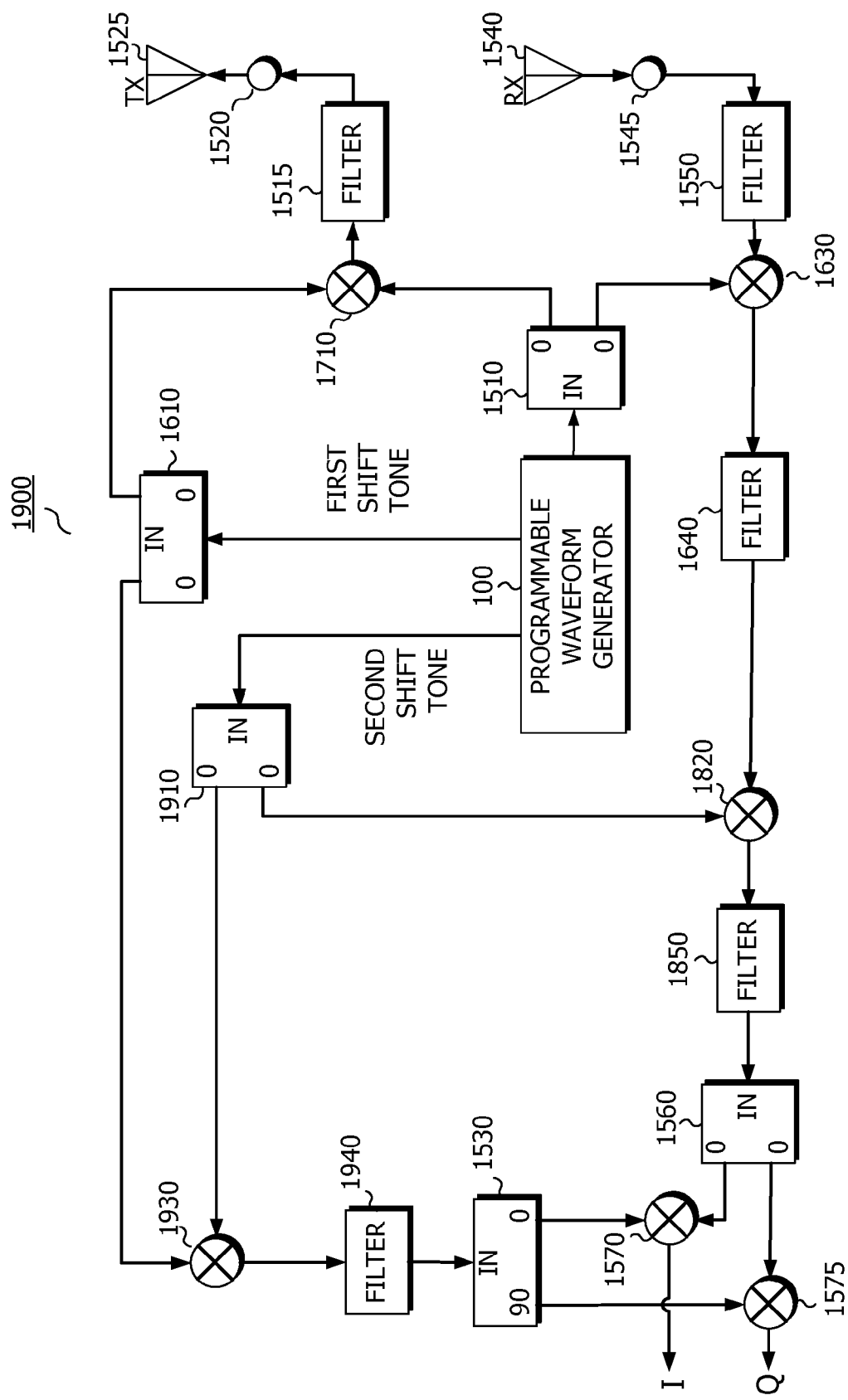
FIG. 19 is a block diagram of a transceiver using the programmable waveform generator of FIG. 1 in a dual conversion vector arrangement according to a second disclosed embodiment.

FIG. 19 is a block diagram of a transceiver using the programmable waveform generator of FIG. 1 in a dual conversion vector arrangement having I and Q signal outputs according to a second disclosed embodiment. As shown in FIG. 19, the transceiver 1900 includes all the parts of transceiver 1800 shown in FIG. 18 plus a sixth mixer 1930, a filter 1940, a first splitter 1910, and a second splitter 1610. The sixth mixer 1930 is configured to produce the equivalent of the third shift tone signal of FIG. 18, by mixing the second shift tone signal with the first shift tone signal. The filter 1940 removes spurious signals.

Transceiver Using Dual-Output Programmable Waveform Generator

Figure 22:
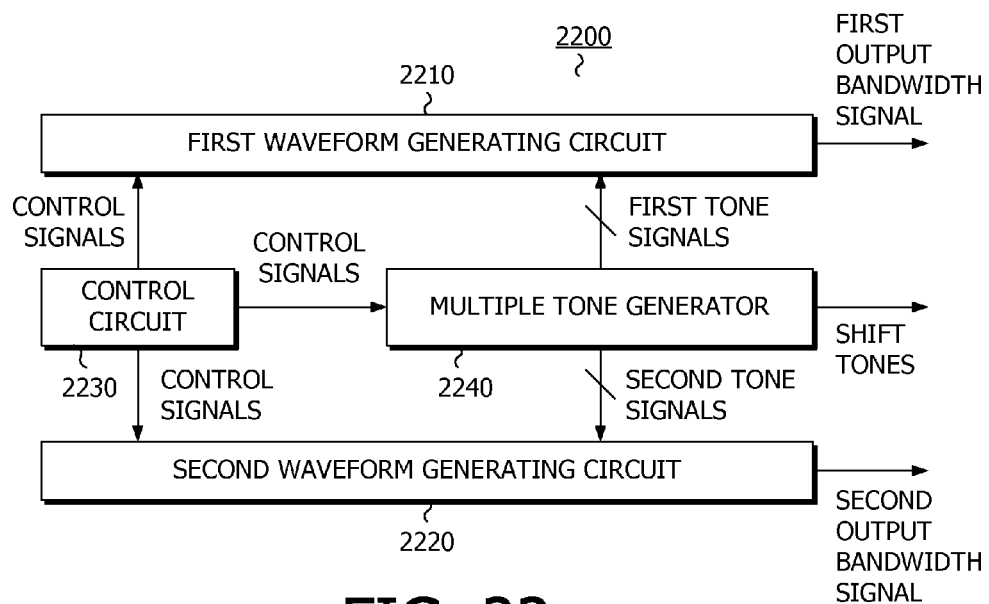
FIG. 22 is a block diagram of a dual-output programmable waveform generator 2200 configured to generate two output signals according to a third disclosed embodiment.

FIG. 22 is a block diagram of a dual-output programmable waveform generator 2200 configured to generate two output signals according to a first disclosed embodiment. As shown in FIG. 22, the waveform generator 2200 includes a first waveform generating circuit 2210, a second waveform generating circuit 2220, a control circuit 2230, and a multiple tone generator 2240

The first waveform generating circuit 2210 and the second waveform generating circuit 2220 both operate as the waveform generating circuit 170 from FIG. 1.

The first waveform generating circuit 2210 receives first tone signals from the multiple tone generator 2240 and control signals from the control circuit 2230, and generates a first output bandwidth signal based on these first tone signals and control signals. Likewise, the second waveform generating circuit 2220 receives second tone signals from the multiple tone generator 2240 and control signals from the control circuit 2230, and generates a second output bandwidth signal based on these second tone signals and control signals.

The first and second tone signals may be the same in some embodiments or different in others. In some embodiments the parameters of the first and second tone signals, the control signals, and the initial bandwidth signal $G_0$ will be selected such that the first and second output bandwidth signals will differ from each other in phase. In certain embodiments the first and second output bandwidth signals will differ from each other by 90 degrees. In other embodiments the difference in phase between the first and second output bandwidth signals can vary, and can in some cases be 0 degrees.

Figure 23:
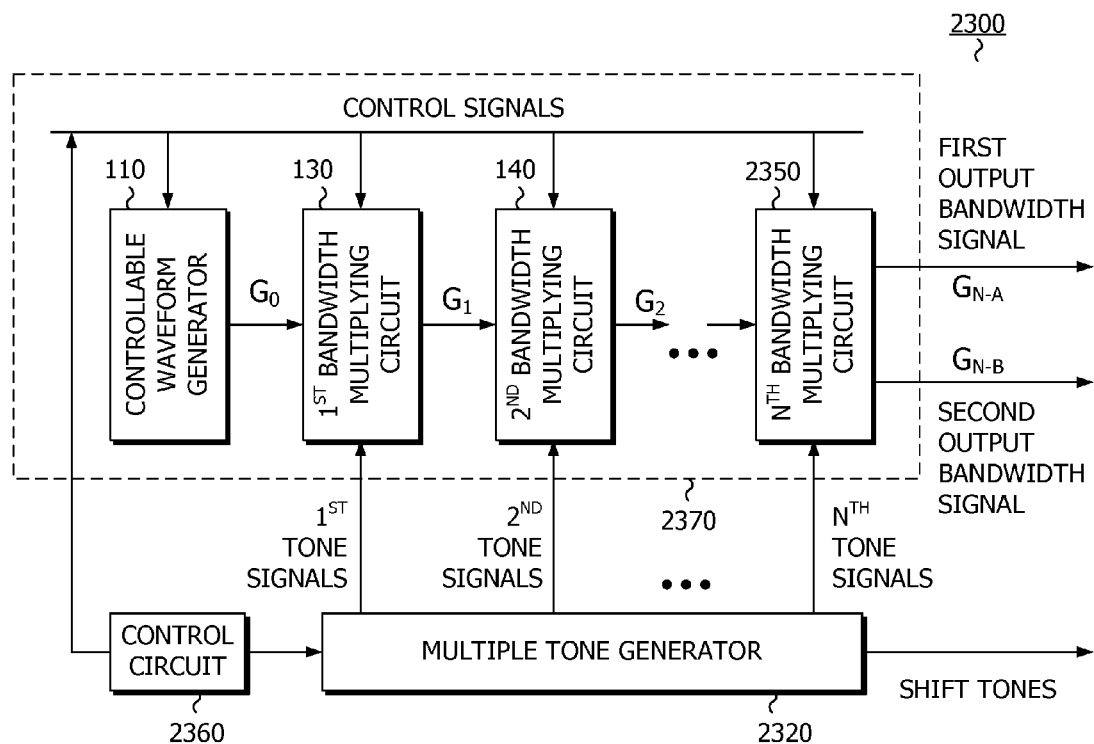
FIG. 23 is a block diagram of a dual-output programmable waveform generator 2300 configured to generate two output signals according to a fourth disclosed embodiment.

FIG. 23 is a block diagram of a dual-output programmable waveform generator 2300 configured to generate two output signals according to a second disclosed embodiment. As shown in FIG. 23, the waveform generator 2300 includes a controllable waveform generator 110, a multiple-tone generator 2320, first through $N^{th}$ bandwidth-multiplying circuits 130, 140, 2350, and a control circuit 2360. The controllable waveform generator 110, and first through $N^{th}$ bandwidth-multiplying circuits 130, 140, 2350 can be collectively referred to as a waveform generating circuit 2370.

The controllable waveform generator 110, and the first through $(N-1)^{th}$ bandwidth-multiplying circuits 130, 140 operate as described above with respect to FIG. 1. The $N^{th}$ bandwidth-multiplying circuit 2350 operates as described above with respect to FIGS. 20 and 21. In particular, the $N^{th}$ bandwidth-multiplying circuit 2350 receives a single input bandwidth waveform and outputs two output bandwidth waveforms, each of which has a bandwidth greater than the input bandwidth waveform.

The multiple-tone generator 2320 operates in a manner similar to the multiple-tone generator 120 of FIG. 1. However in this embodiment the $N^{th}$ tone signals may be different for the $N^{th}$ bandwidth-multiplying circuit 2350. In some embodiments the $N^{th}$ bandwidth-multiplying circuit 2350 may require more tone signals to generate two output bandwidth signals than the first through $(N-1)^{th}$ bandwidth multiplying circuits 130, 140 require to generate two output bandwidth signal, as described above with respect to FIG. 22.

Furthermore, although FIG. 23 describes only the $N^{th}$ bandwidth-multiplying circuit 2350 as being a one-input-two-output bandwidth-multiplying circuit, other of the first through $(N-1)^{th}$ 130, 140 could be one-input-two-output bandwidth-multiplying circuits as well.

In addition, although the programmable waveform generators 2200, 2300 of FIGS. 22 and 23 are both dual output programmable waveform generators, this is by way of example only. Alternate embodiments can be provided that generate more than two output signals.

Figure 24:
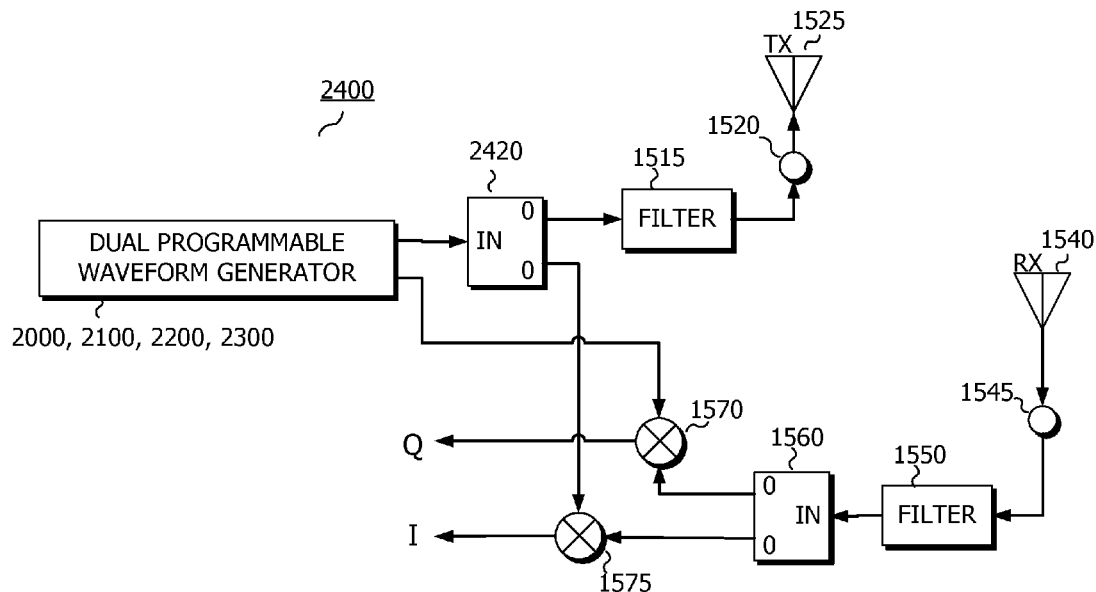
FIG. 24 is a block diagram of a transceiver using dual programmable waveform generator in a direct conversion vector arrangement according to a disclosed embodiment.

FIG. 24 is a block diagram of a transceiver 2400 using a dual programmable waveform generator 2000, 2100, 2200, 2300 in a direct conversion vector arrangement according to a disclosed embodiment. As shown in FIG. 24, the transceiver 2400 includes a dual programmable waveform generator 2000, 2100, 2200, 2300, a splitter 2420, transmit filter 1515, transmit port 1520, transmit antenna 1525, receive antenna 1540, receive port 1545, receive filter 1550, splitter 1560, first mixer 1575, and second mixer 1570.

In transceiver 2400, the dual programmable waveform generator is configured to produce two signals, a first output signal that is 90 degrees apart from a second output signal. Mixers 1570 and 1575 are configured to accept the received signal via splitter 1560. Mixer 1575 is configured to mix the first output signal with the received signal to produce an in-phase signal (I). Mixer 1570 is configured to mix the second output signal with the received signal to generate a quadrature phase signal (Q). These I and Q signals can then be used by a later processor in accordance with the particular implementation.

Figure 25:
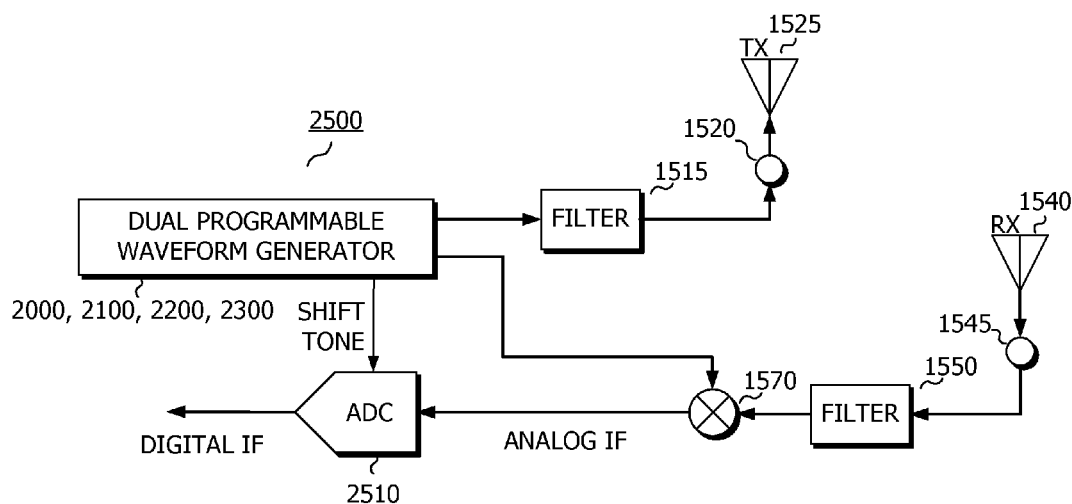
FIG. 25 is a block diagram of a transceiver using a dual programmable waveform generator in a single conversion arrangement having an intermediate frequency (IF) signal output according to a disclosed embodiment.

FIG. 25 is a block diagram of a transceiver 2500 using a dual programmable waveform generator 2000, 2100, 2200, 2300 in a single conversion arrangement having an intermediate frequency (IF) signal output according to a disclosed embodiment. As shown in FIG. 24, the transceiver 2500 includes a dual programmable waveform generator 2000, 2100, 2200, 2300, transmit filter 1515, transmit port 1520, transmit antenna 1525, receive antenna 1540, receive port 1545, receive filter 1550, mixer 1570, and analog to digital converter (ADC) 2510.

In transceiver 2500, the dual programmable waveform generator is configured to produce two signals, a first output signal that is offset in frequency from a second output signal. The first output signal is filtered by filter 1515 and conducted to the transmit port 1520 where it is coupled to a transmit antenna 1525 Mixer 1570 is configured to accept the received signal after being filtered by filter 1525 and produce an analog intermediate frequency (IF) signal. The IF signal can then be used by a later processor in accordance with the particular implementation. Typically the IF signal is digitized, as shown with analog-to-digital converter (ADC) 2510 to produce a digital IF signal.

Figure 26:
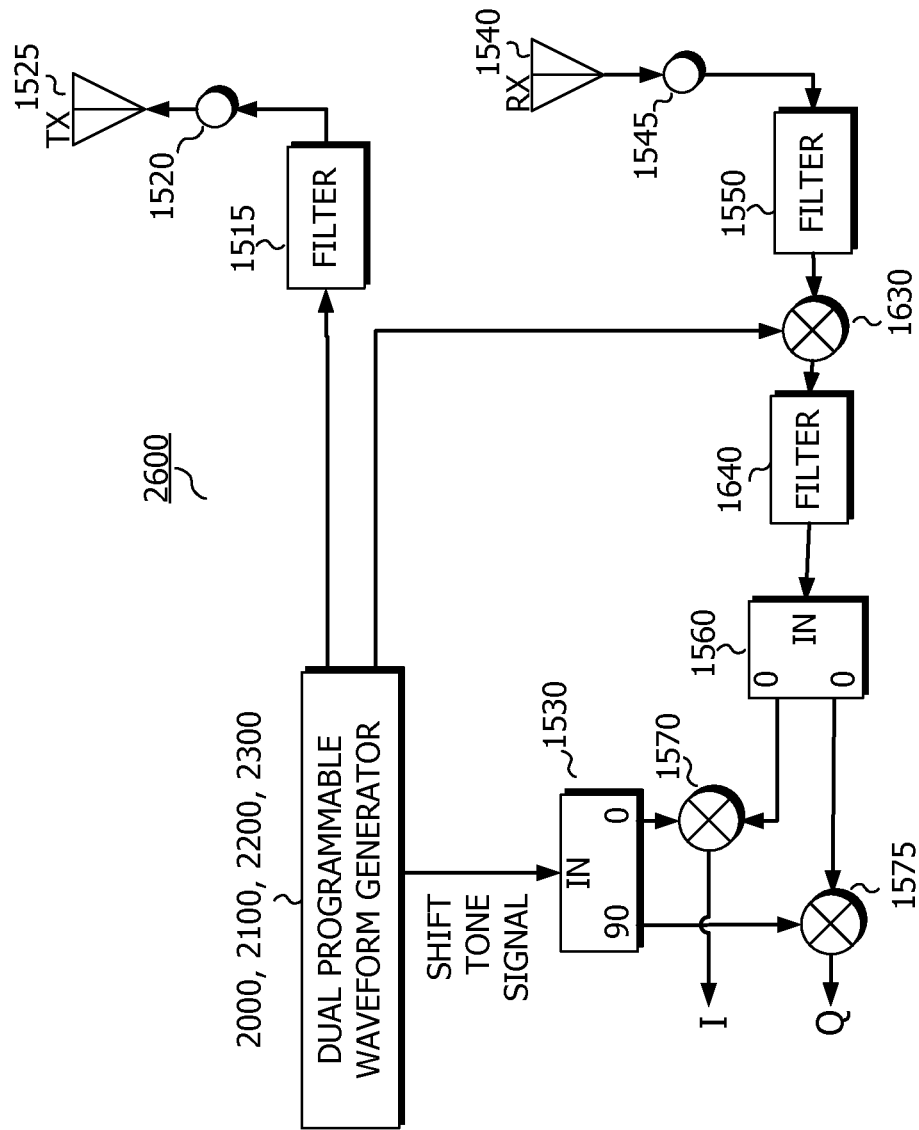
FIG. 26 is a block diagram of a transceiver using a dual programmable waveform generator in a single conversion arrangement having I and Q signal outputs according to a disclosed embodiment.

FIG. 26 is a block diagram of a transceiver 2600 using a dual programmable waveform generator in a single conversion arrangement having I and Q signal outputs according to a disclosed embodiment.

As shown in FIG. 26, the transceiver 2600 includes a dual programmable waveform generator 2000, 2100, 2200, 2300, transmit filter 1515, transmit port 1520, transmit antenna 1525, receive antenna 1540, receive port 1545, receive filter 1550, splitter 1560, first mixer 1575, and second mixer 1570, third mixer 1630, IF filter 1640, 90 degree splitter 1530.

In transceiver 2600, the dual programmable waveform generator 2000, 2100, 2200, 2300 is configured to produce two signals, a first output signal that is shifted in frequency relative to the second output signal by a frequency equal to, or nearly equal to, the shift tone signal. The received signal is coupled from receive antenna 1540, to receive port 1545, where it is filtered by receive filter 1550 to produce a filtered receive signal. Mixer 1630 is configured to mix the second output of the programmable waveform generator 2000, 2100, 2200, 2300, with the filtered received signal to form an intermediate frequency (IF) signal. The IF signal is filtered by IF filter 1640 to produce a filtered IF signal. Mixers 1570 and 1575 are configured to accept the filtered IF signal via splitter 1560. The 90-degree splitter 1530 is configured to accept a shift tone signal from the dual programmable waveform generator 2000, 2100, 2200, 2300, and generate two output signals that are separated by 90 degrees. Mixer 1575 is configured to mix the 90-degree output signal from splitter 1530, with the filtered IF signal to produce a quadrature phase signal (Q). Mixer 1570 is configured to mix the s the 0-degree output signal from splitter 1530, with the filtered IF signal to produce an in-phase quadrature phase signal (Q). These I and Q signals can then be used by a later processor in accordance with the particular implementation.

Method of Operation

Figure 27:
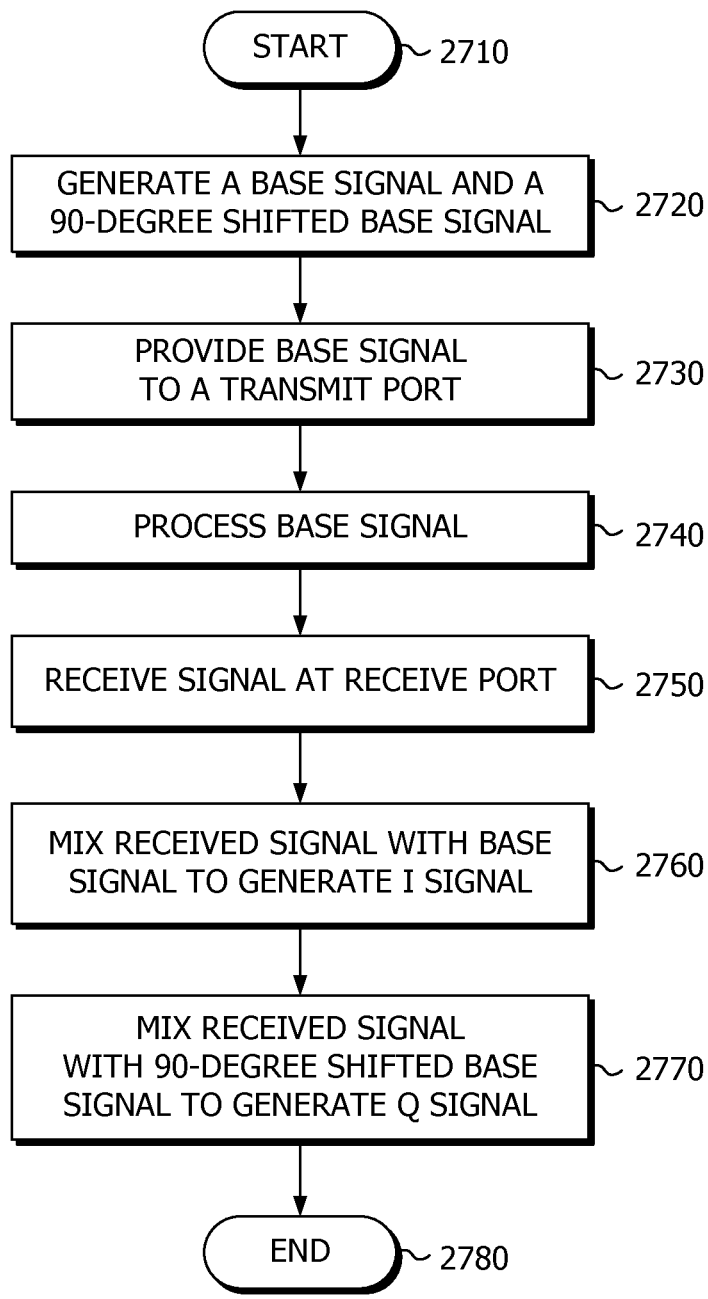
FIG. 27 is a flow chart showing a transceiver operation according to a disclosed embodiment.

FIG. 27 is a flow chart showing a transceiver operation 2700 according to a disclosed embodiment. As shown in FIG. 27, after it starts (2710), the transceiver operation 2700 generates a base signal and a 90-degree shifted base signal. (2720) This can be achieved in a number of ways, such as by having a single waveform generator produce a signal and have that signal pass through a 90-degree shifter, by having a single waveform generator designed to output a base signal and a 90-degree shifted base signal, by having two separate waveform generators that are designed to output signals 90 degrees out of phase, or by any suitable method or circuit. The base signal may be generated in accordance with the operation described above with respect to FIG. 11, such that it is a wideband base signal.

This base signal is then provided to a transmit port in a transmission device. (2730) This transmission port may be attached to an antenna, a testing device, a metal wire, a fiber optic wire, or any appropriate element for providing a signal to a remote element.

The base signal is then processed as appropriate to the method. (2740) This could involve transmitting the base signal over a wired or wireless medium, converting the base signal to sound at a speaker for transmission over the air, converting the base signal to sonar waves for transmission, passing the base signal to a testing device, etc.

The base signal is then received at a receive port at a remote element. (2750) This could be accomplished by receiving the base signal wirelessly at an antenna, receiving the base signal over a metal wire, receiving the base signal over a fiber optic cable, detecting the base signal as a sound signal at a microphone, receiving the base signal from a testing device, receiving the base signal as a sonar signal, etc.

The received signal is them mixed with the base signal to generate an in-phase (I) signal (2760), and is mixed with the 90-degree shifted base signal to generate a quadrature-phase (Q) signal (2770). These I and Q signals can then be used as needed to process the information contained in the transmitted signal.

For the purposes of this disclosure the transceiver operation ends (2780) once the I and Q signals are obtained. However, it should be clear that other operations will be performed on the I and Q signals farther down the signal stream.

In addition, although the operation of FIG. 27 discloses a method in which I and Q signals are obtained, alternate embodiments could also extract intermediate frequency (IF) signals, as described above.

In this way, the waveforms generated according to the method shown in FIG. 11 can be transmitted across a medium and used in an operational manner. For example, the waveforms could be used in a radar device, a sonar device, a testing device, etc.

FIG. 28 is a flow chart showing a transceiver operation according to a disclosed embodiment. As shown in FIG. 28, after it starts (2810), the transceiver operation 2800 generates a base signal and a frequency-degree shifted base signal. (2820) In some embodiments this may be a 90-degree shift, as noted above with respect to FIG. 27. However, in other embodiments the amount of frequency shift may vary.)

This frequency shift can be achieved in a number of ways, such as by having a single waveform generator produce a signal and have that signal pass through a phase shifter, by having a single waveform generator designed to output a base signal and a phase shifted base signal, by having two separate waveform generators that are designed to output signals out of phase, or by any suitable method or circuit. The base signal may be generated in accordance with the operation described above with respect to FIG. 11, such that it is a wideband base signal.

The frequency-shifted signal is then provided to a transmit port in a transmission device. (2830) This transmission port may be attached to an antenna, a testing device, a metal wire, a fiber optic wire, or any appropriate element for providing a signal to a remote element.

The frequency-shifted signal is then processed as appropriate to the method. (2840) This could involve transmitting the frequency-shifted signal over a wired or wireless medium, converting the frequency-shifted signal to sound at a speaker for transmission over the air, converting the frequency-shifted signal to sonar waves for transmission, passing the frequency-shifted signal to a testing device, etc.

The frequency-shifted signal is then received at a receive port at a remote element. (2850) This could be accomplished by receiving the frequency-shifted signal wirelessly at an antenna, receiving the frequency-shifted signal over a metal wire, receiving the frequency-shifted signal over a fiber optic cable, detecting the frequency-shifted signal as a sound signal at a microphone, receiving the frequency-shifted signal from a testing device, receiving the frequency-shifted signal as a sonar signal, etc.

The received signal is them mixed with the base signal to generate an intermediate frequency (IF) signal (2860). This IF signal can then be used as needed to process the information contained in the transmitted signal.

For the purposes of this disclosure the transceiver operation ends (2870) once the IF signal is obtained. However, it should be clear that other operations will be performed on the IF signal farther down the signal stream.

In addition, although the operation of FIG. 28 discloses a method in which an IF signal is obtained, alternate embodiments could instead extract in-phase (I) and quadrature-phase (Q) signals, as described above.

In this way, the waveforms generated according to the method shown in FIG. 11 can be transmitted across a medium and used in an operational manner. For example, the waveforms could be used in a radar device, a sonar device, a testing device, etc.

FIG. 29 is a flow chart showing a transceiver operation according to a disclosed embodiment. The operation of FIG. 29 is similar to that of FIG. 28, except that the base signal is provided to a transmit port, and the frequency-shifted signal is mixed with a received signal to generate the IF signal. As shown in FIG. 29, after it starts (2910), the transceiver operation 2900 generates a base signal and a frequency-shifted base signal. (2920) In some embodiments this may be a 90-degree shift, as noted above with respect to FIG. 27. However, in other embodiments the amount of frequency shift may vary.)

This frequency shift can be achieved in a number of ways, such as by having a single waveform generator produce a signal and have that signal pass through a phase shifter, by having a single waveform generator designed to output a base signal and a phase shifted base signal, by having two separate waveform generators that are designed to output signals out of phase, or by any suitable method or circuit. The base signal may be generated in accordance with the operation described above with respect to FIG. 11, such that it is a wideband base signal.

This base signal is then provided to a transmit port in a transmission device. (2930) This transmission port may be attached to an antenna, a testing device, a metal wire, a fiber optic wire, or any appropriate element for providing a signal to a remote element.

The base signal is then processed as appropriate to the method. (2940) This could involve transmitting the base signal over a wired or wireless medium, converting the base signal to sound at a speaker for transmission over the air, converting the base signal to sonar waves for transmission, passing the base signal to a testing device, etc.

The base signal is then received at a receive port at a remote element. (2950) This could be accomplished by receiving the base signal wirelessly at an antenna, receiving the base signal over a metal wire, receiving the base signal over a fiber optic cable, detecting the base signal as a sound signal at a microphone, receiving the base signal from a testing device, receiving the base signal as a sonar signal, etc.

The received signal is them mixed with the frequency-shifted signal to generate an intermediate frequency (IF) signal (2960). This IF signal can then be used as needed to process the information contained in the transmitted signal.

For the purposes of this disclosure the transceiver operation ends (2970) IF signal is obtained. However, it should be clear that other operations will be performed on the IF signal farther down the signal stream.

In addition, although the operation of FIG. 29 discloses a method in which an IF signal is obtained, alternate embodiments could instead extract in-phase (I) and quadrature-phase (Q) signals, as described above.

In this way, the waveforms generated according to the method shown in FIG. 11 can be transmitted across a medium and used in an operational manner. For example, the waveforms could be used in a radar device, a sonar device, a testing device, etc.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A transceiver, comprising:
   a programmable waveform generator configured to generate a base signal, the programmable waveform generator including
      a controllable waveform generator configured to generate an initial bandwidth signal having an initial frequency bandwidth;
      a multiple tone generator configured to simultaneously generate a plurality of tone signals, each of the plurality of tone signals having a different frequency;
      one or more bandwidth multiplying circuits arranged in series and configured to sequentially multiply the initial bandwidth signal by selected tone signals from the plurality of tone signals to generate the base signal; and
      a control circuit a controller configured to control the operation of the controllable waveform generator, the tone generator and the one or more bandwidth multiplying circuits;
   a transmit port configured to output the base signal;
   a receive port configured to accept a received signal;
   a 90-degree splitter configured to receive the base signal and to generate a first split signal at a 0-degree output and a second split signal at a 90-degree output, the first and second split signals being separated by 90 degrees in phase;
   a first-mixer configured to mix the received signal and the first split signal to generate a quadrature-phase signal; and
   a second-mixer configured to mix the received signal and the second split signal to generate an in-phase signal.

2. The transceiver of claim 1, further comprising:
   a transmit antenna connected to the transmit port; and
   a receive antenna connected to the receive port.

3. The transceiver of claim 2,
   wherein the transceiver is a radar transceiver.

4. The transceiver of claim 1, further comprising:
   a first splitter connected between the programmable waveform generator and the transmit port and between programmable waveform generator and the 90-degree splitter, the first splitter configured to provide the base signal to both the transmit port and the 90-degree splitter.

5. The transceiver of claim 4, further comprising:
   a transmit filter connected between the first splitter and the transmit port.

6. The transceiver of claim 1, further comprising:
   a transmit filter connected between the programmable waveform generator and the transmit port.

7. The transceiver of claim 1, wherein:
the one or more bandwidth multiplying circuits comprise two or more bandwidth multiplying circuits arranged in series and configured to sequentially multiply the initial bandwidth signal by selected tone signals from the plurality of tone signals to generate the base signal.

8. The transceiver of claim 1, wherein:
each of the one or more bandwidth multiplying circuits is configured to receive two or more of the plurality of tone signals, and is configured to multiply an input signal by a selected one of the two or more of the plurality of tone signals to generate an output signal.

9. A radar transceiver, comprising:
a programmable waveform generator configured to generate a base waveform, the programmable waveform generator including
  a controllable waveform generator configured to generate an initial bandwidth signal having an initial frequency bandwidth;
  a multiple tone generator configured to simultaneously generate a plurality of tone signals, each of the plurality of tone signals having a different frequency;
  one or more bandwidth multiplying circuits arranged in series and configured to sequentially multiply the initial bandwidth signal by selected tone signals from the plurality of tone signals to generate the base waveform; and
  a control circuit a controller configured to control the operation of the controllable waveform generator, the tone generator and the one or more bandwidth multiplying circuits;
a transmit antenna configured to transmit the base waveform as an outgoing waveform;
a 90° power splitter configured to split the base waveform to a first split waveform and a second split waveform, the first and second split waveforms being separated by 90° in phase;
a receive antenna configured to receive an incoming waveform;
a first mixer configured to mix the incoming waveform with the first split waveform to generate an in-phase waveform; and
a second mixer configured to mix the incoming waveform with the second split waveform to generate a quadrature-phase waveform.

10. The radar transceiver of claim 9, further comprising:
a first splitter connected between the programmable waveform generator and the transmit antenna and between programmable waveform generator and the 90° power splitter, the first splitter configured to provide the base waveform to both the transmit antenna and the 90° power splitter.

11. The radar transceiver of claim 10, further comprising:
a transmit filter connected between the first splitter and the transmit antenna.

12. The radar transceiver of claim 9, further comprising:
a transmit filter connected between the programmable waveform generator and the transmit antenna.

13. The radar transceiver of claim 9, further comprising:
a second splitter connected between the receive antenna and the first and second mixers, the first splitter configured to provide the incoming waveform to both the first and second mixers.

14. The radar transceiver of claim 13, further comprising:
a receive filter connected between the receive antenna and the second splitter.

15. The radar transceiver of claim 9, further comprising:
a receive filter connected between the transmit antenna and the first and second mixers.

16. The radar transceiver of claim 9, wherein:
the one or more bandwidth multiplying circuits comprise two or more bandwidth multiplying circuits arranged in series and configured to sequentially multiply the initial bandwidth signal by selected tone signals from the plurality of tone signals to generate the base signal.

17. The radar transceiver of claim 9, wherein:
each of the one or more bandwidth multiplying circuits is configured to receive two or more of the plurality of tone signals, and is configured to multiply an input signal by a selected one of the two or more of the plurality of tone signals to generate an output signal.

* * * * *